US012800476B2

(12) United States Patent
Leen et al.

(10) Patent No.: US 12,800,476 B2
(45) Date of Patent: Nov. 17, 2026

(54) OPTICAL SYSTEM AND METHOD WITH ULTRA-LONG PATH MULTIPASS CELL HAVING NON-PARAXIAL PROPAGATION

(71) Applicant: Nikira Labs Inc., Mountain View, CA (US)

(72) Inventors: John Brian Leen, Sunnyvale, CA (US); Manish Gupta, Mountain View, CA (US)

(73) Assignee: Nikira Labs Inc., Mountain View, CA (US)

( * ) Notice: Subject to any disclaimer, the term of this patent is extended or adjusted under 35 U.S.C. 154(b) by 122 days.

(21) Appl. No.: 18/965,842

(22) Filed: Dec. 2, 2024

(65) Prior Publication Data

US 2025/0189434 A1 Jun. 12, 2025

Related U.S. Application Data

(60) Provisional application No. 63/608,654, filed on Dec. 11, 2023.

(51) Int. Cl.
*G01N 21/03* (2006.01)
*G01J 3/02* (2006.01)
(Continued)

(52) U.S. Cl.
CPC ............ *G01N 21/031* (2013.01); *G01J 3/021* (2013.01); *G01J 3/08* (2013.01); *G01J 3/42* (2013.01); *G01J 2003/421* (2013.01)

(58) Field of Classification Search
CPC G01N 21/031; G01J 3/021; G01J 3/08; G01J 3/42; G01J 2003/421
See application file for complete search history.

(56) References Cited

U.S. PATENT DOCUMENTS 6,795,190 B1 * 9/2004 Paul ........................ G01N 21/39 356/440
2011/0164251 A1 * 7/2011 Richter ................ G01N 21/031 356/440

(Continued)

FOREIGN PATENT DOCUMENTS

JP 2022124718 A 8/2022

OTHER PUBLICATIONS

Jiang, G.S., Wang, 2024. Methane gas sensor based on a novel dual-path multipass cell. Microwave and Optical Technology Letters, 66(1), p. e33794. (Year: 2024).*

(Continued)

*Primary Examiner* — Michelle M Iacoletti
*Assistant Examiner* — Mohamed Doumbia
(74) *Attorney, Agent, or Firm* — LOZA & LOZA, LLP; David S. Sarisky

(57) ABSTRACT

An optical system includes a light source, a multipass cell, and a detector. The multipass cell includes a first mirror and a second mirror spaced apart from the first mirror to form an optical cavity. A central axis extends between the first mirror and the second mirror. The light source outputs a light beam and is arranged to inject the light beam into the optical cavity of the multipass cell at an injection angle such that propagation of the light beam into the optical cavity is non-paraxial. The non-paraxial injection path and large-angle first reflection of the light beam causes the light beam to reflect back-and-forth between the first mirror and the second mirror to form a final (or cumulative) spot pattern that covers a large proportion of the surface areas of the first mirror and the second mirror before it exits the optical cavity.

22 Claims, 25 Drawing Sheets
(8 of 25 Drawing Sheet(s) Filed in Color)

(51) Int. Cl.
*G01J 3/08* (2006.01)
*G01J 3/42* (2006.01)

(56) References Cited

U.S. PATENT DOCUMENTS

| | | | | |
|---|---|---|---|---|
| 2012/0242989 | A1* | 9/2012 | So | G01N 21/031 356/402 |
| 2022/0260816 | A1* | 8/2022 | Katsumata | G02B 17/004 |

OTHER PUBLICATIONS

Herriott (1965. Folded optical delay lines. Applied Optics, 4(8), pp. 883-889.) (Year: 1965).*
Herriott, D.R. and Schulte, H.J., 1965. Folded optical delay lines. Applied Optics, 4(8), pp. 883-889. (Year: 1965).*
Cao et al.; "Design and simulation of a multipass cell consisting of two plane mirrors and a biconvex lens"; Optical Engineering; vol. 59(3); https://www.spiedigitallibrary.org/journals/optical-engineering; Mar. 18, 2020; 10 pages.
Cao et al.; "Generalized calculation model of different types of optical multi-pass cells based on refraction and reflection law"; Optics and Laser Technology; https://doi.org/10.1016/j.optlastec2021.106958; Feb. 15, 2021; 6 pages.
Cheng et al.; "Design and Analysis of Novel Folded Optical Multi-Pass Cell"; Frontiers in Physics; vol. 10, Article 907715; ; www.frontiersin.org; Jun. 17, 2022; 7 pages.
Cui et al.; "Calculation model of dense spot pattern multi-pass cells based on a spherical mirror aberration"; Optical Society of America; Optics Letters; vol. 44, No. 5; Feb. 19, 2019; 4 pages.
Cui et al.; "Three-Dimensional Printed Miniature Fiber-Coupled Multipass Cells with Dense Spot Patterns for ppb-Level Methane Detection Using a Near-IR Diode Laser"; American Chemical Society; ACS Publications; Analytical Chemistry; https://dx.doi.org/10.1021/acs.analchem.0c01931; Sep. 1, 2020; 8 pages.
Gragossian et al.; "Astigmatic Herriott cell for optical refrigeration"; Optical Engineering; vol. 56(1); http://opticalengineering.spiedigitallibrary.org/; Dec. 16, 2016; 5 pages.
Herriott et al.; "Folded Optical Delay Lines"; Applied Optics; vol. 4, No. 8; Aug. 1965; 8 pages.
Li et al.; "Fast time response measurements of gaseous nitrous acid using a tunable diode laser absorption spectrometer: HONO emission source from vehicle exhausts"; American Geophysical Union; Geophysical Research Letters; vol. 35, L04803; Feb. 19, 2008; 5 pages.
Nowakowski et al.; "Cavity Enhanced Absorption Spectroscopy Sensor"; Optical and Acoustical Methods in Science and Technology; ACTA Physica Polonica A; vol. 116, No. 3; 2009; 5 pages.
Silver et al.; "Simple dense-pattern optical multipass cells"; Optical Society of America; Applied Optics; vol. 44, No. 31; Nov. 1, 2005; 12 pages.
Xi et al.; "Near-Infrared Dual-Gas Sensor System for Methane and Ethane Detection Using a Compact Multipass Cell"; Frontiers in Physics; vol. 10, Article 843171; www.frontiersin.org; Mar. 4, 2022; 9 pages.
International Search Report and Written Opinion, International Patent Application No. PCT/US2024/058540, Feb. 26, 2025, 21 pgs.
Jiang et al.; "Methane gas sensor based on a novel dual-path multipass cell"; Microwave and Optical Technology Letters; John Wiley & Sons, Inc.; US; vol. 66, No. 1; Jun. 19, 2023; 7 pgs.

* cited by examiner

OPTICAL SYSTEM AND METHOD WITH ULTRA-LONG PATH MULTIPASS CELL HAVING NON-PARAXIAL PROPAGATION

CROSS-REFERENCE TO RELATED APPLICATION

This application claims the benefit of U.S. Provisional Application Ser. No. 63/608,654, entitled "Optical System and Method With Ultra-Long Path Multipass Cell Having Non-Paraxial Propagation" and filed on Dec. 11, 2023, which is expressly incorporated by reference herein in its entirety.

GOVERNMENT LICENSE RIGHTS

This invention was made with government support under SBIR Contract No. DE-SC0021534 awarded by the Department of Energy. The government has certain rights in the invention.

TECHNICAL FIELD

The present disclosure relates generally to optical systems and methods, and more particularly, to optical systems and methods with ultra-long path multipass cells using non-paraxial propagation.

BACKGROUND

Absorption spectroscopy is a method of detecting, spectating, and quantifying molecular constituents in gaseous, liquid and solid samples by measuring the light absorbed as a function of wavelength and sample interaction length. Many specific methods have been developed to introduce the light, sample the light, and analyze the sampled light. Example absorption spectroscopy methods include dispersive spectroscopy, Fourier Transform Infrared (FTIR) spectroscopy, and tunable diode laser absorption spectroscopy (TDLAS).

In each of these example methods, and other known methods, the intensity of light transmitted through an absorbing material is governed by the Beer-Lambert Law:

$$I = I_0 e^{-\epsilon c l} \qquad \text{Eq. 1}$$

where:

$I_0$ is the initial intensity,

ε is the molar absorption coefficient, c is the concentration, and l is the interaction path length.

However, it is often the case that the amount of light absorbed by the sample is too small to be detected or cannot be detected with sufficient accuracy to satisfy the needs of the application. This occurs when the absorption coefficient ε, the concentration c, or both are too small to result in appreciable changes in the intensity.

To address these cases, some methods of absorption spectroscopy increase the path length (or propagation length) over which the light and the sample interact. One such method is multipass spectroscopy. Multipass spectroscopy uses an optical cell having a set of one or more mirrors arranged to reflect a beam of light through a predetermined path that folds the light beam through the sample multiple times, thus amplifying the interaction length and increasing the observable change in intensity. Early examples of multipass spectroscopy cells are Herriott cells (see, D. R. Herriott and J. H. Schulte, Folded optical delay lines, Appl. Opt. 4, 883, (1965)) and White cells (see, J. U. White, Long paths of large aperture, J. Opt. Soc. Am. 32, 285 (1942)). An example of a spot pattern produced by a Herriot cell is shown in FIG. 17A.

There exist several examples of methods to increase the path length from those possible with a standard Herriott cell. Among the oldest and most well-known is the astigmatic cell which allows the creation of Lissajous patterns that utilize a much higher proportion of the mirror area before the beam is captured, typically through the same hole through which the beam enters the cell. See Silver, Joel A. "Simple dense-pattern optical multipass cells." Applied optics 44.31 (2005). Unfortunately, these cells have proven difficult to work with because the alignments for long path lengths are very specific, occur at points throughout the alignment range and have tight angular tolerances.

Other variations of Herriot cells and White cells are disclosed in McManus, J. Barry, Paul L. Kebabian, and M. S. Zahniser. "Astigmatic mirror multipass absorption cells for long-path-length spectroscopy." Applied Optics 34.18 (1995): 3336-3348; Li, Yongquan Q., James J. Schwab, and Kenneth L. Demerjian. "Fast time response measurements of gaseous nitrous acid using a tunable diode laser absorption spectrometer: HONO emission source from vehicle exhausts." Geophysical research letters 35.4 (2008); and Gragossian, Aram, et al. "Astigmatic Herriott cell for optical refrigeration." Optical Engineering 56.1 (2017): 011110-011110.

Another, recent method of creating more intracavity reflections before the beam is captured through a detection hole is described in Cui, Ruyue, et al. "Calculation model of dense spot pattern multi-pass cells based on a spherical mirror aberration." Optics Letters 44.5 (2019): 1108-1111. In this method, non-paraxial propagation is used to create a pattern of concentric circles, a pattern of adjacently arranged circles, or a loop pattern to utilize more of the mirror surface. However, by design the described patterns follow a limited path and do not evolve/process to maximally utilize more of the mirror but instead, repeat beam positions after the loops have run through one cycle. The described loop patterns create on the order of hundreds of intracavity reflections and path lengths that are long for the cell volume, but ultimately short on an absolute scale (e.g., <30 m). Examples of spot patterns produce by the method disclosed in Cui are shown in FIGS. 17B-17D.

These multipass spectroscopy cells permit hundreds of intracavity reflections and path lengths of nearly 100 meters. Unfortunately, as is well documented in the literature, further increases in the path length are not possible without an increase in the volume of the cell because the number of passes is limited by the overlapping of adjacent spots. Additionally, these very long path length cells are notoriously difficult to align and maintain and so, while the desire to increase path length exists for many applications, practical long path absorption spectroscopy systems have not been mass produced. Furthermore, the standard method of calculating spot patterns in multipass cells uses an approximation (e.g., sin θ≅θ) that is not accurate when the angle of reflection on the mirror is large and/or there are many reflections that accumulate the error of the approximation.

SUMMARY

In one aspect, the disclosure relates to an optical system that includes a light source, a multipass cell, and a detector.

The multipass cell includes a first mirror having an injection aperture, and a second mirror that is spaced apart from the first mirror to form an optical cavity. The multipass cell also has a collection aperture through which light is detected. A central axis extends between the center of the first mirror and the center of the second mirror. The light source is configured to output a light beam and is arranged to inject the light beam through the injection aperture into the optical cavity of the multipass cell at an injection angle such that propagation of the light beam into the optical cavity is non-paraxial. The non-paraxial injection and subsequent cavity propagation is facilitated by three differentiating aspects relative to existing multipass cell configurations: (1) a short physical cell length in the range of 1 cm to 50 cm, (2) non-astigmatic, e.g., spherical, cylindrical, etc., mirrors with a large radius of curvature in the range of 5 cm and 50 cm, and (3) large mirror diameter in the range of 2.5 cm and 15 cm.

Under the conditions disclosed herein, the steep ray reflections and propagation angles mean that the usual equations used to calculate ray propagation are inaccurate (e.g., $\tan(\theta) \cong \theta$) and new behavior can be induced. Specifically, by using non-paraxial ray propagation, the multipass cell and the injection angle can be configured such that intracavity propagation of the light beam produces a cumulative spot pattern on the first mirror that is a accumulation of a plurality (N) of individual looped spot patterns, where each individual looped spot pattern extends around the center of the first mirror, and the individual looped spot patterns process relative to the center of the first mirror such that, while forming the second individual looped spot pattern the central light ray of the light beam is not within a distance D of an edge of the injection aperture or an edge of the collection aperture, where D is greater than 0.1 of the diameter of the injection aperture or the diameter of the collection aperture. The described precessions have the appearance, behavior, and benefits similar to the intracavity patterns produced in astigmatic Herriott cells but is produced using the novel, different and distinct mechanism of non-paraxial ray propagation.

In another aspect, the disclosure relates to an optical system that includes a multipass cell and a light source optically coupled with the multipass cell. The multipass cell includes an optical cavity between respective surfaces of a first mirror having an injection aperture and a second mirror spaced apart from the first mirror by a physical length between 1 cm and 50 cm. The first mirror and the second mirror are non-astigmatic, e.g., spherical, cylindrical, etc., and have a radius of curvature between 5 cm and 50 cm and a diameter between 2.5 cm and 15 cm. The light source is optically coupled with the multipass cell so that a light beam output by the light source travels along an injection path at an injection angle through the injection aperture into the optical cavity. The injection angle induces: 1) non-paraxial propagation of the light beam between the first mirror and the second mirror for an intracavity propagation length between 10 meters and 2000 meters, and 2) a precession of the reflections of the light beam relative to the respective center of each of the first mirror and the second mirror.

It is understood that other aspects of apparatuses and methods will become readily apparent to those skilled in the art from the following detailed description, wherein various aspects of apparatuses and methods are shown and described by way of illustration.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

Various aspects of apparatuses and methods will now be presented in the detailed description by way of example, and not by way of limitation, with reference to the accompanying drawings, wherein.

DETAILED DESCRIPTION

Figure 1:
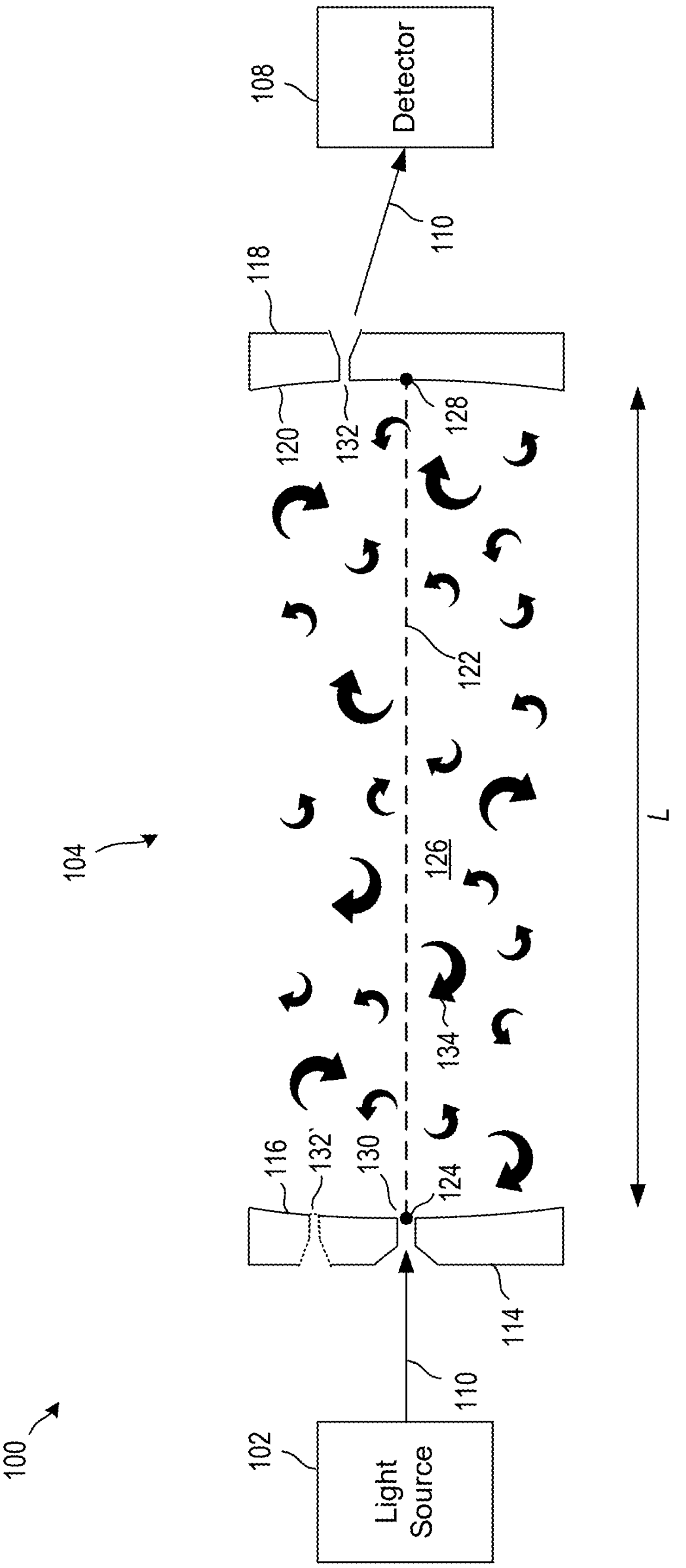
FIG. 1 is a schematic diagram of an absorption spectroscopy system, also referred to herein as an optical system, having a multipass cell.

With reference to FIG. 1, an absorption spectroscopy system 100 includes a light source 102, a multipass cell 104, and a detector 108. The multipass cell 104 includes a first mirror 114 and a second mirror 118 that is spaced apart from the first mirror. The space between the surfaces 116, 120 of the first mirror 114 and the second mirror 118 is referred to herein as an optical cavity 126. The optical cavity 126 is characterized by a cavity length L corresponding to the distance between the center 124 of the first mirror 114 and the center 128 of the second mirror 118.

The first mirror 114 and the second mirror 118 are secured in place relative to each other by one or more mechanical structures such that a central axis 122 extends through the center 124 of the first mirror and the center 128 of the second mirror. In some embodiments the first mirror 114 and the second mirror 118 are secured in place relative to each other by rods (not shown) to provide a multipass cell 104 having an open optical cavity 126. In some embodiments the first mirror 114 and the second mirror 118 are secured in place relative to each other by a tube (not shown) to provide a multipass cell 104 having a closed optical cavity 126.

The light source 102 is configured to output a light beam 110 having a wavelength corresponding to an absorption region of interest. The light source 102 may be, for example, a laser. The light source 102 is arranged to inject the light beam 110 into the optical cavity 126 of the multipass cell 104 where it interacts with a medium sample 134. To this end, the first mirror 114 includes an injection aperture 130 and the light source is positioned to direct the light beam 110 through the injection aperture into the optical cavity 126 of the multipass cell 104 at an injection angle relative to the central axis 122. Within the optical cavity 126, the light beam 110 reflects back-and-forth between the first mirror 114 and the second mirror 118 until it exits the cavity.

The detector 108 is arranged to collect the light beam 110 from the multipass cell 104. To this end, the second mirror 118 includes a collection aperture 132 through which the light beam 110 exits the optical cavity 126 of the multipass cell 104. The detector 108 is positioned relative to the collection aperture of the second mirror to receive the light beam 110. The detector 108 is further configured to detect an intensity of the light beam 110 of the wavelength corresponding to the absorption region of interest. In some configurations, the collection aperture 132' is included in the first mirror 114. In some configurations, the injection aperture 130 is also the collection aperture.

The multipass cell 104 is characterized by a path length (or propagation length or intracavity propagation length) over which the light beam 110 and the medium sample 134 interact within the optical cavity 126. The path length of the multipass cell 104 may be quantified in terms of the total distance the light beam 110 propagates as it reflects or folds back-and-forth between the first mirror 114 and the second mirror 118 before it exits the collection aperture. The path length may also be quantified in terms of a number of passes the light beam 110 makes while it is within the cavity of the multipass cell 104, where propagation of the light beam from one mirror to the other mirror is equal to one pass.

Figure 2A:
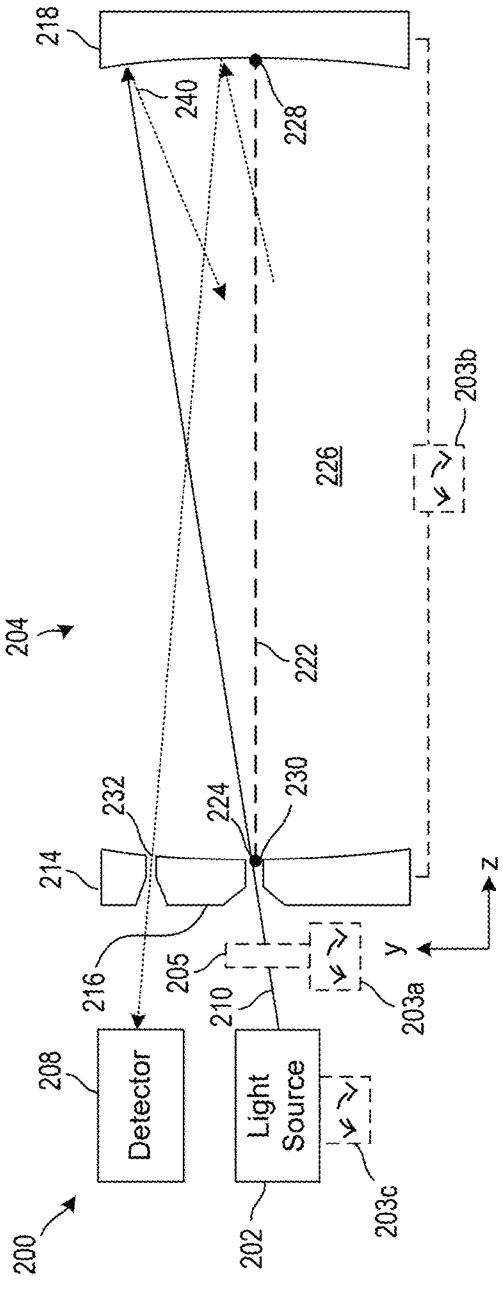
FIG. 2A is a schematic diagram of an optical system viewed in a direction of an yz plane of a multipass cell, and having a light beam passing through an injection aperture of a first mirror at an injection angle ($\theta_x$, $\theta_y$) and out a collection aperture of the first mirror.
Figure 2B:
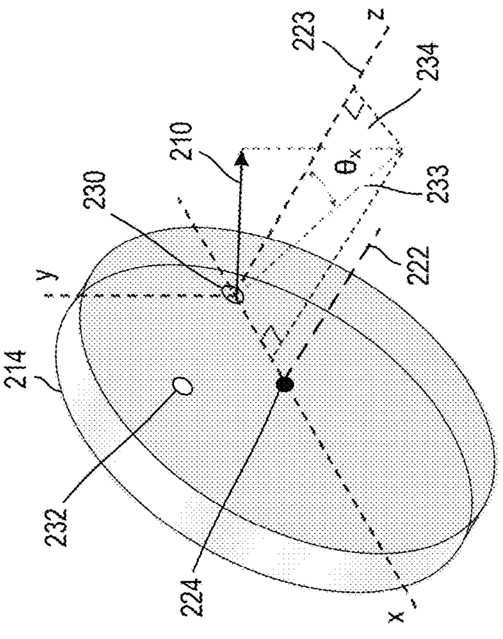
FIG. 2B is an illustration of the light beam passing through the injection aperture of the first mirror of the multipass cell of FIG. 2A, and a projection of the light beam on the xz plane showing $\theta_x$ of the injection angle ($\theta_x$, $\theta_y$).
Figure 2C:
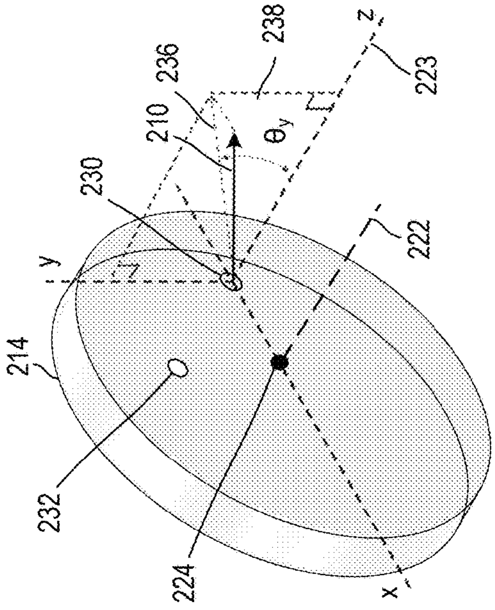
FIG. 2C is an illustration of the light beam passing through the injection aperture of the first mirror of the multipass cell of FIG. 2A, and a projection of the light beam on the yx plane showing $\theta_y$ of the injection angle ($\theta_x$, $\theta_y$).

With reference to FIGS. 2A, 2B, and 2C, an absorption spectroscopy system or optical system 200 disclosed herein includes a light source 202, a multipass cell 204, and a detector 208. The multipass cell 204 includes a first mirror 214 and a second mirror 218 that is spaced apart from the first mirror to form an optical cavity 226. A central axis 222 extends between the center 224 of the first mirror 214 and the center 228 of the second mirror 218. The multipass cell 204 shown in FIGS. 2A and 2B can be an open cavity configuration. Alternatively, the multipass cell 204 can be a closed cavity configuration.

The light source 202 is configured to output a light beam 210 and is arranged to inject the light beam into the optical cavity 226 of the multipass cell 204 at an injection angle such that propagation of the light beam into the optical cavity is non-paraxial. Non-paraxial propagation of the light beam 210 into the optical cavity 226 means the light beam is injected into the optical cavity 226 along an injection path that is not parallel to the central axis 222 of the optical cavity, and the first intracavity reflection 240 of the light beam from a mirror (e.g., from the second mirror 218) is at a large angle (e.g., in excess of 0.01 radians) relative to the central axis. The non-paraxial injection path and large-angle first reflection 240 of the light beam 210 causes the light beam to reflect back-and-forth between the first mirror 214 and the second mirror 218 to form a final (or cumulative) spot pattern that covers a large proportion of the surface areas of the first mirror and the second mirror before it exits the optical cavity 226.

Continuing with reference to FIGS. 2A, 2B, and 2C, the first mirror 214 includes an injection aperture 230 and the light source 202 is positioned to direct the light beam 210 at the injection angle through the injection aperture and into the optical cavity 226 of the multipass cell 204. Within the optical cavity 226 of the multipass cell 204, the light beam 210 propagates back-and-forth between the surfaces of the first mirror 214 and the second mirror 218 until it exits the optical cavity 226 of the multipass cell.

The injection angle of the light beam 210 is characterized by an angle $\theta_x$ and an angle $\theta_y$. With reference to FIG. 2B, the angle $\theta_x$ is the angle between a projection 233 of the light beam 210 on an xz plane 234 and a z axis 223 through the injection aperture 230, where the z axis 223 is parallel to and offset from the central axis 222. With reference to FIGS. 2C, the angle $\theta_y$ is the angle between a projection 236 of the light beam 210 on an yz plane 238 and the z axis 223 through the injection aperture 230.

In some embodiments, the optical system 200 includes a mechanism that is configured to change the injection angle ($\theta_x$, $\theta_y$) at which the light beam 210 is injected into the optical cavity 226 through the injection aperture 230. The goal in changing the injection angle ($\theta_x$, $\theta_y$) is to have the light beam 210 pass through the injection aperture 230 with "good" efficiency. Essentially, the light beam 210 should be aimed more toward the center of the injection aperture 230, as opposed to the side of the aperture, which wastes power. The efficiency of the aiming of the light beam 210 can be quantified by measuring the power or intensity of light transmitted through the injection aperture 230. In some embodiments, the intensity of the light beam 210 that passes through the injection aperture 230 is considered efficient if it is above a threshold intensity. For example, in the case of a coherent light source, the threshold may be at least 50% of the intensity of the light beam 210 at its origin, i.e., at the output of the light source 202. In the case of a non-coherent light source, the threshold may be at least 50% of the intensity of the light beam 210 at its origin, i.e., at the output of the light source 202.

Figure 2D:
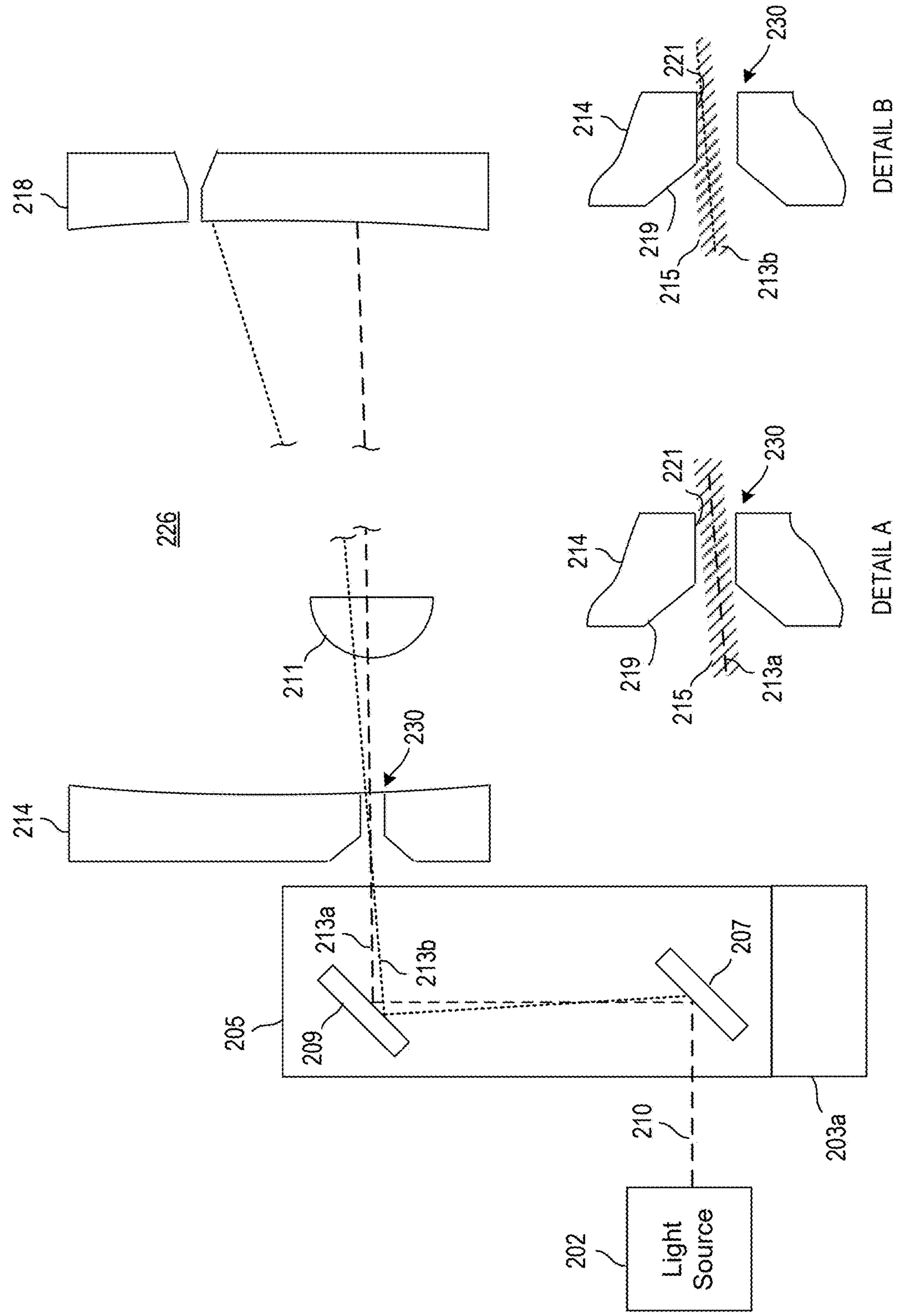
FIG. 2D is an illustration of a mechanism for adjusting the injection path of a light beam through an injection aperture.

With reference to FIG. 2D, in one embodiment the optical system 200 includes a mechanism 203*a* and an optics assembly 205 that is optically coupled between the light source 202 and the first mirror 214. The optics assembly 205 includes a displacement mirror 207 and an angle mirror 209. The displacement mirror 207 is arranged and configured to receive the light beam 210 from the light source 202 and to direct the light beam to the angle mirror 209, which is arranged and configured to direct the light beam 210 along an injection path 213*a*, 213*b* through the injection aperture 230. In this embodiment, the mechanism 203*a* can be a motor or a gimbal that is coupled with the displacement mirror 207 and the angle mirror 209 and configured to adjust the orientations of the mirrors to thereby change the orientation of the injection path 213*a*, 231*b* through the injection aperture 230.

Two exemplary injection paths 213*a*, 213*b* for the light beam 210 are shown in FIG. 2D. The first injection path 213*a* is more closely aligned with the axis of the injection aperture 230 than the second injection path 213*b*, such that a light beam 210 traveling along the first injection path overlaps with the injection aperture 230 to a greater extent than a light beam traveling along the first injection path.

With reference to Detail A in FIG. 2D, overlap in this context means a portion of the profile 215 of the light beam 210 falls within the interior of the injection aperture 230 along the length of the injection aperture. In other words, a portion of the profile 215 of the light beam 210 travels through and exits the injection aperture 230 without interference from a surface 219 or an interior sidewall 221 of the aperture. For purposes of describing the concept of overlap, the profile 215 of the light beam 210 shown in Detail A travels through the injection aperture 230 without any interference. In this case, the first injection path 213*a* provides a high level of overlap between the profile 215 of the light beam 210 and the injection aperture 230. In practice, however, at least a portion of the profile of the light beam 210 will be interfered with, as described below.

With reference to Detail B, the second injection path 213*b* is not as well aligned with the axis of the injection aperture 230 as the first injection path 213*a*. In other words, the second injection path 213*b* is offset from the axis of the injection aperture 230. In this case, a portion of the profile 215 of the light beam 210 travels through and exits the injection aperture 230 is interfered by a surface 219 and an interior sidewall 221 of the aperture. While the profile 215 of this light beam still overlaps with the injection aperture 230, it does not overlap to the same extent or level as a light beam traveling along the first injection path 213*a*, as shown in Detail A. Thus, the alignment in Detail B is not as good as the alignment in Detail A because it admits less power to the optical cavity 226 than the alignment of Detail A.

With reference to FIGS. 2B, 2C, and 2D, a method of changing the injection angle ($\theta_x$, $\theta_y$) at which the light beam 210 is injected into the optical cavity 226 through the injection aperture 230 includes:

i. Placing a light detector 211 inside the optical cavity 226, just after the injection aperture 230.
ii. Adjusting the displacement mirror 207 and the angle mirror 209 to provide an injection path 213*a* for the light beam 210 that closely aligns the central light ray of the light beam with the center axis of the injection aperture 230, such as shown in Detail A.

iii. Leaving the displacement mirror 207 fixed while setting the angle mirror 209 to a one of a plurality of desired injection angles $\theta_x$, where $\theta_x$ is an array of all angles of interest, e.g., 0, 0.01, 0.02 radians, etc.

iv. Leaving the angle mirror 209 fixed at the set injection angle $\theta_x$ while stepping the displacement mirror 207 through a range of displacement-mirror angles relative to the x axis and recording for each displacement-mirror angle, the intensity of light transmitted into the optical cavity 226 using the light detector 211. Determining and recording the peak displacement-mirror angle relative to the x axis that provides the peak intensity of light.

v. Repeating steps iii and iv for each of the plurality of desired injection angles $\theta_x$ in the array of angles of interest.

vi. Leaving the displacement mirror 207 fixed while setting the angle mirror 209 to a one of a plurality of desired injection angles $\theta_y$, where $\theta_y$ is an array of all angles of interest, e.g., 0, 0.01, 0.02 radians, etc.

vii. Leaving the angle mirror 209 fixed at the set injection angle $\theta_y$ while stepping the displacement mirror 207 through a range of displacement-mirror angles relative to the y axis and recording for each displacement-mirror angle, the intensity of light transmitted into the optical cavity 226 using the light detector 211. Determining and recording the peak displacement-mirror angle relative to the y axis that provides the peak intensity of light.

viii. Repeating steps iii and iv for each of the plurality of desired injection angles $\theta_y$ in the array of angles of interest.

ix. Setting the displacement mirror 207 and the angle mirror 209 to an injection angle ($\theta_x$, $\theta_y$) based on the recorded peak intensities of light.

Regarding steps iv and vii, in cases where a desired injection angle $\theta_x$ or a desired injection angle $\theta_y$ is between the angles of interest, e.g., desired injection angle 0.015 is between angles of interest 0.01 and 0.02, the peak displacement-mirror angle for the desired injection angle can be determined by interpolating to a value between the peak displacement-mirror angles for the angles of interest on either side the desired injection angle.

Returning to FIG. 2A, the mechanism 203*b* can be a motor (servo, galvo, stepper, etc.) or a gimbal associated with an assembly of the first mirror 214 and the second mirror 218. In this configuration, the mechanism 203*b* is configured to adjust the angular position or orientation of the central axis 222 of the assembly relative to the path along which the light beam 210 travels, to thereby change the injection angle ($\theta_x$, $\theta_y$) while maintaining an overlap between the profile of the light beam 210 and the injection aperture 230.

The mechanism 203*c* can be a motor (servo, galvo, stepper, etc.) or a gimbal associated with the light source 202. In this configuration, the mechanism 203*c* is configured to adjust the angular position or orientation of the path along which the light beam 210 travels from the light source relative to the central axis 222 of an assembly of the first mirror 214 and the second mirror 218, to thereby change the injection angle ($\theta_x$, $\theta_y$) while maintaining an overlap between the profile of light beam 210 and the injection aperture 230.

The detector 208 is arranged to collect the light beam 210 from the multipass cell 204. To this end, the first mirror 214 includes a collection aperture 232 through which the light beam 210 exits the optical cavity 226 of the multipass cell 204 and the detector 208 is positioned relative to the collection aperture of the first mirror to receive the light beam 210. In other embodiments of the multipass cell 204, the collection aperture can be the same aperture as the injection aperture 230. In other embodiments of the multipass cell 204, the collection aperture can be included on the second mirror 218. In any case, the detector 208 is arranged to collect the light beam 210 from the multipass cell 204 and is configured to detect an intensity of the light beam of the wavelength corresponding to the absorption region of interest.

In accordance with this disclosure, the multipass cell 204 and the injection angle ($\theta_x$, $\theta_y$) at which the light source 202 injects a light beam 210 into the optical cavity 226 are configured to enable intracavity propagation of the light beam by numerous reflections or passes of the light beam between the first mirror 214 and the second mirror 218. As previously mentioned, theses numerous reflections produce a cumulative spot pattern on the first mirror and a cumulative spot pattern on the second mirror before exiting the optical cavity 226 through the collection aperture 232, where the cumulative spot patterns cover a large proportion of the surface areas of the first mirror and the second mirror.

The cumulative spot pattern on the first mirror 214 that results from intracavity propagation of the light beam 210 is a cumulation of a number $N_1$ of individual looped spot patterns, where each looped spot pattern extends around the center 224 of the first mirror. Each individual looped spot pattern may extend 360 degrees around the center 224 of the first mirror. The looped spot patterns precess relative to the center 224 of the first mirror 214 such that for each of the second looped spot pattern through to and including the penultimate looped spot pattern $(N-1)_1$, the spot closest to the collection aperture 232 deviates from edge of the collection aperture by a distance D, where D is greater than 0.1 of the diameter of the collection aperture. In cases where the collection aperture 232 is also the injection aperture 230, the spot closest to the injection aperture 230 deviates from edge of the collection aperture by a distance D, where D is greater than 0.1 of the diameter of the collection aperture. Stated another way, while forming the second looped spot pattern (or looped patterns through to and including the penultimate looped spot pattern $(N-1)_1$) the central light ray of the light beam 210 is never within a distance D of an edge of injection aperture 230 or an edge of the collection aperture 232, where D is greater than 0.1 of the diameter of the injection aperture or the diameter of the collection aperture. In any case, as the light beam 210 produces these looped spot patterns, its central light ray avoids exiting the optical cavity 226 until the last looped spot pattern $N_1$. In some embodiments the number $N_1$ of individual looped spot patterns is in the range of 25 to 20000.

Similarly, the cumulative spot pattern on the second mirror 218 that results from intracavity propagation of the light beam 210 is a cumulation of a number $N_2$ of individual looped spot patterns, where each looped spot pattern extends around the center 228 of the second mirror. Each individual looped spot pattern may extend 360 degrees around the center 224 of the first mirror. The looped spot patterns precess relative to the center 228 of the second mirror 218 such that for each of the second looped spot pattern through to and including the penultimate looped spot pattern $(N-1)_2$, the spot closest to the collection aperture 232 deviates from edge of the collection aperture by a distance D, where D is greater than 0.1 of the diameter of the collection aperture. In cases where the collection aperture 232 is also the injection aperture 230, the spot closest to the injection aperture 230 deviates from edge of the collection aperture by a distance D, where D is greater than 0.1 of the diameter of the collection aperture. Stated another way, while forming the second looped spot pattern (or looped patterns through to and including the penultimate looped spot pattern $(N-1)_2$) the central light ray of the light beam 210 is never within a distance D of an edge of injection aperture 230 or an edge of the collection aperture 232, where D is greater than 0.1 of the diameter of the injection aperture or the diameter of the collection aperture. As such, the central light ray of the light beam 210 that produces these looped spot patterns avoids exiting the optical cavity 226 until the last looped spot pattern $N_2$. In some embodiments the number $N_2$ of individual looped spot patterns is in the range of 25 to 20000.

Examples of optical systems 200 having different multipass cells 204 and injection angle $(\theta_x, \theta_y)$ configurations that result in different cumulative spot patterns and different propagation path lengths are presented below.

First Example Configuration

In a first example, an optical system 200 having a multipass cell 204 having a short physical cell length, a pair of non-astigmatic mirrors, each with a large radius of curvature, and a large diameter, and an injection angle $(\theta_x, \theta_y)$ specified as follows provides a propagation path length of approximately 800 meters:

- first mirror 214=2.54 cm (2 inch) diameter with a radius of curvature (ROC) of 300 mm;
- second mirror 218=2.54 cm (2 inch) diameter with a ROC of 300 mm;
- cavity length (L)=197.2 mm;
- injection angle $(\theta_x, \theta_y)=(-0.1000, 0.0591)$ radians;
- injection aperture 230=3 mm diameter, located 15 mm from the center 224 of the first mirror 214;
- collection aperture 232=1 mm diameter, located 18 mm from the center 224 of the first mirror, but rotated by +20 degrees relative to the injection aperture 230.

With reference to FIGS. 3A-3E, a first set of reflections of the light beam between the first mirror 214 and the second mirror 218 results in a first looped spot pattern $\mathbf{301}_1$ (shown in FIG. 3E) on the first mirror 214 and a first looped spot pattern $\mathbf{301}_2$ (shown in FIG. 3E) on the second mirror 218. In this example, fifty reflections are included in the first set of reflections and are shown in FIGS. 3A-3F in increments of 10 reflections per mirror to illustrate that formation of the first looped spot patterns $\mathbf{301}_1$, $\mathbf{301}_2$ results from spots that generally cross back and forth from one half of the mirror to the other half as they form a looped spot pattern.

Figure 3A:
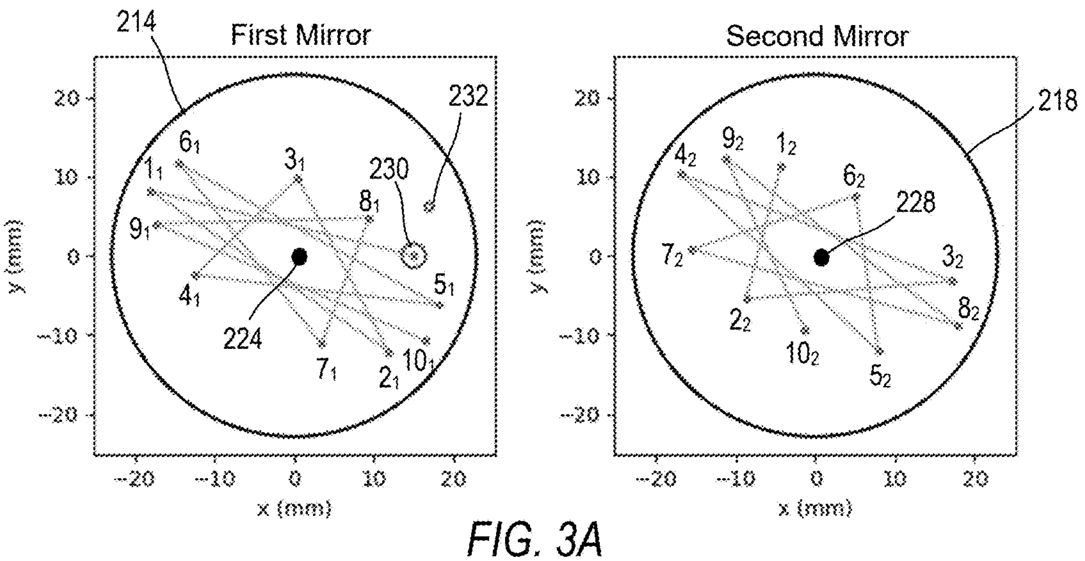
FIGS. 3A-3E are a sequence of illustrations showing the formation of a first looped spot pattern resulting from intracavity reflections of a light beam between a first mirror and a second mirror of a first configuration of the multipass cell of FIG. 2A.

More specifically, with reference to FIG. 3A, after entering the optical cavity 226 through the injection aperture 230 through the first mirror 214, the light beam reflects from the second mirror 218 at spot $\mathbf{1}_2$ then from the first mirror 214 at spot $\mathbf{1}_1$ then from the second mirror 218 at spot $\mathbf{2}_2$ then from the first mirror 214 at spot $\mathbf{2}_1$ and so on to spot $\mathbf{10}_1$ on the first mirror. Note, in FIG. 3A and similar figures that follow, the connecting lines from one spot to the next indicate the sequence of spot formation and do not represent a path of the light beam 210.

Figure 3B:
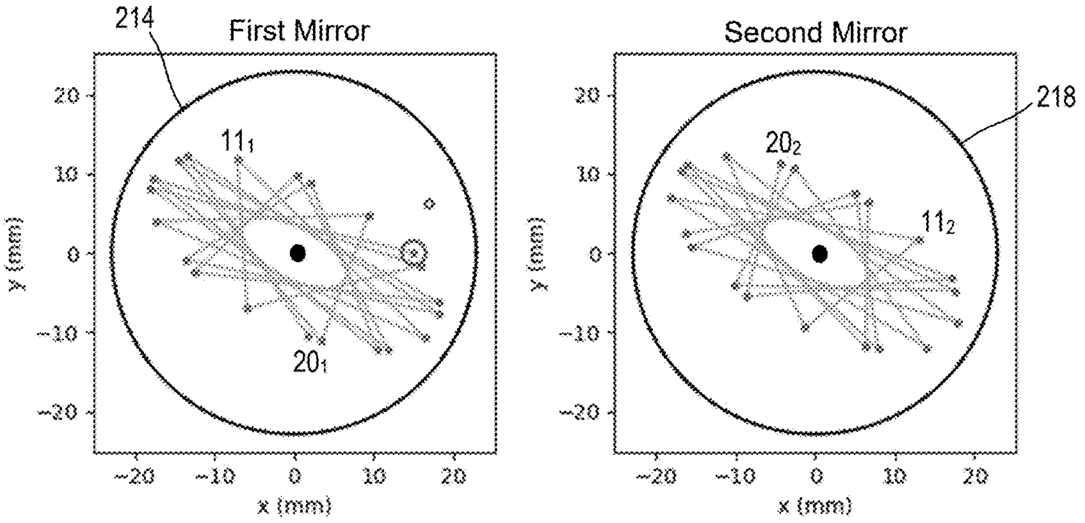

With reference to FIG. 3B, intracavity reflections of the light beam 210, where the next set of 10 reflections corresponding to spots $\mathbf{11}_1$ through $\mathbf{20}_1$ on the first mirror 214 and spots $\mathbf{11}_2$ through $\mathbf{20}_2$ on the second mirror 218 result. Note, for clarity in illustration not all spots are numbered in FIG. 3B.

Figure 3C:
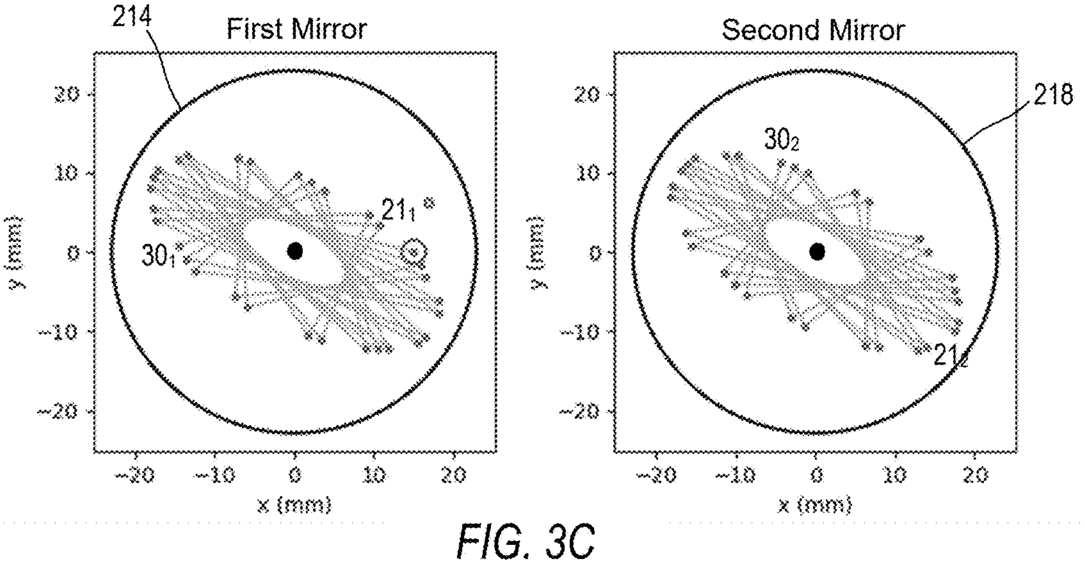
Figure 3D:
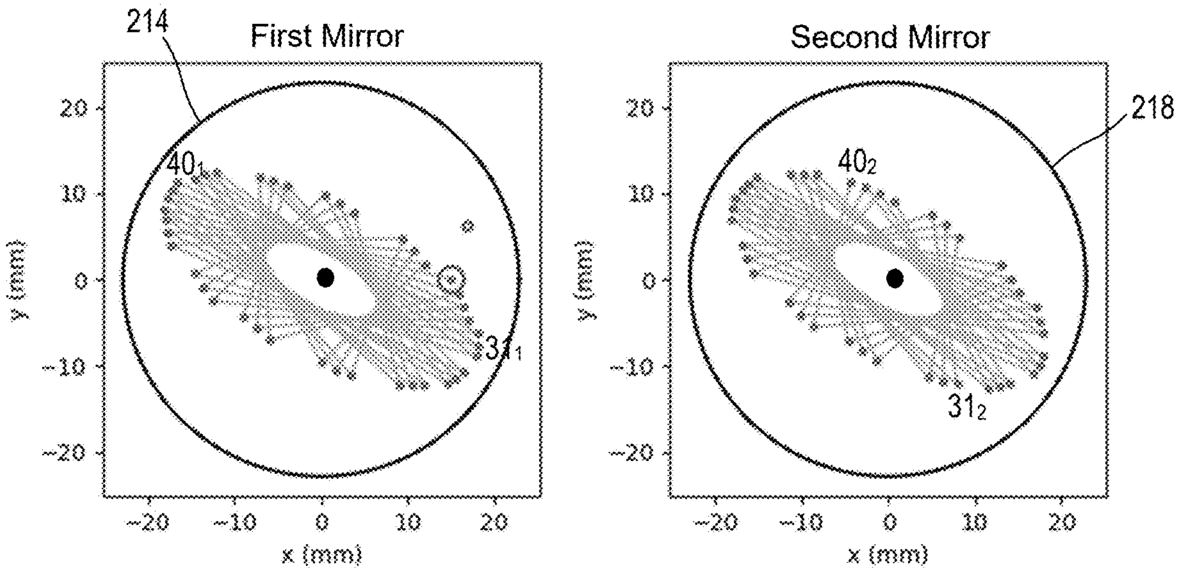
Figure 3E:
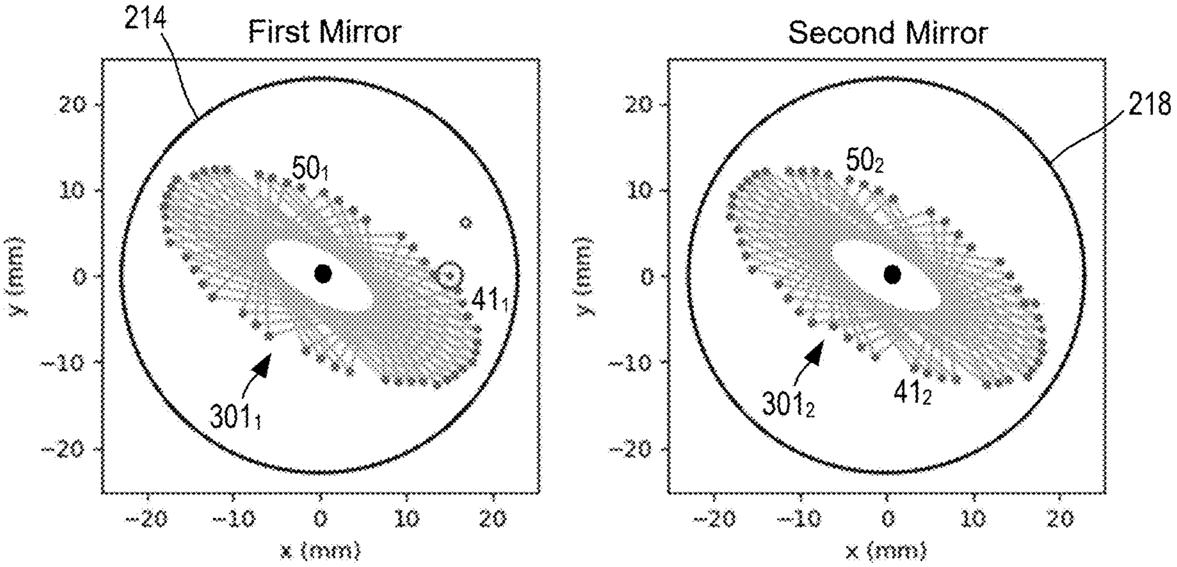
Figure 4A:
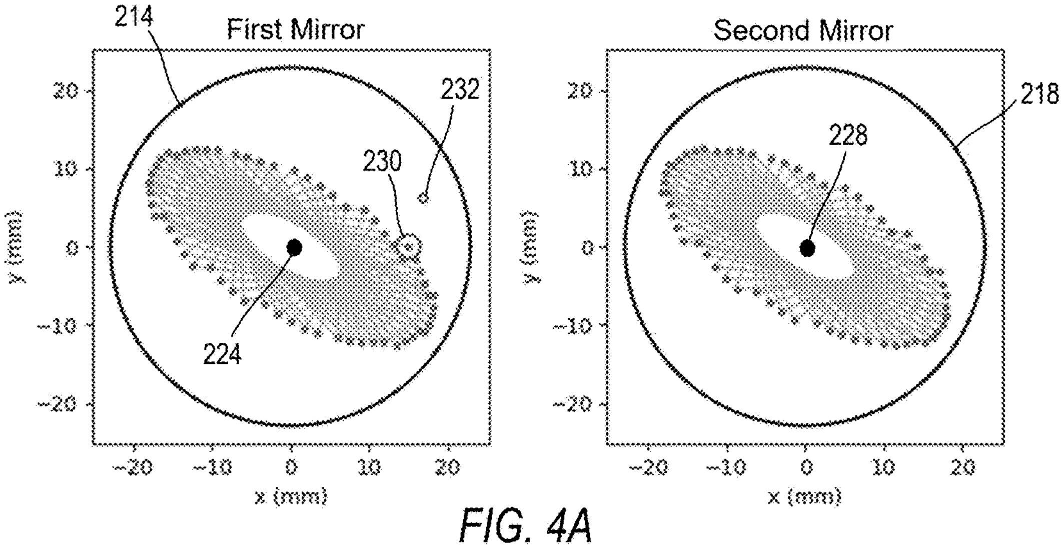
FIGS. 4A-4E are a sequence of illustrations showing the formation of a second looped spot pattern relative to the first looped spot pattern of FIGS. 3A-3E.
Figure 4B:
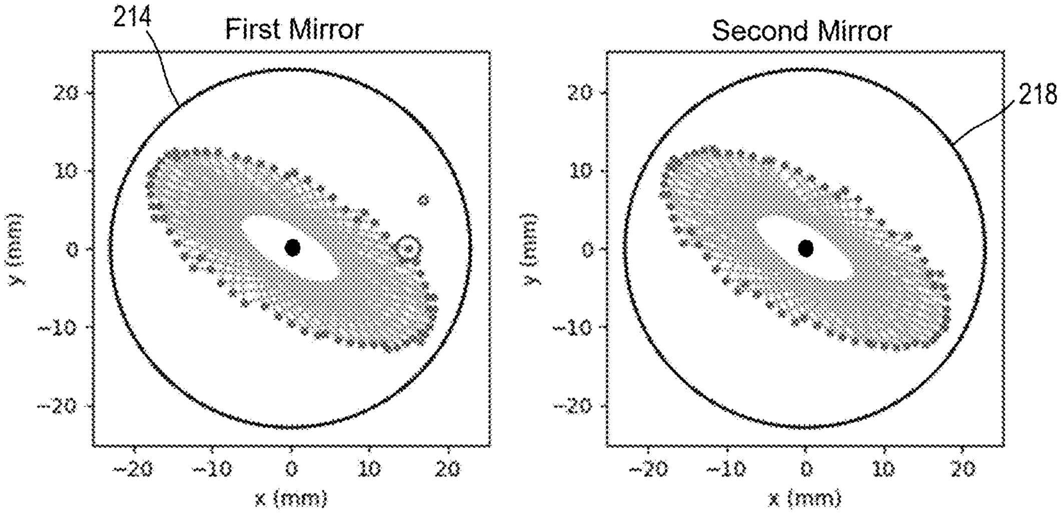
Figure 4C:
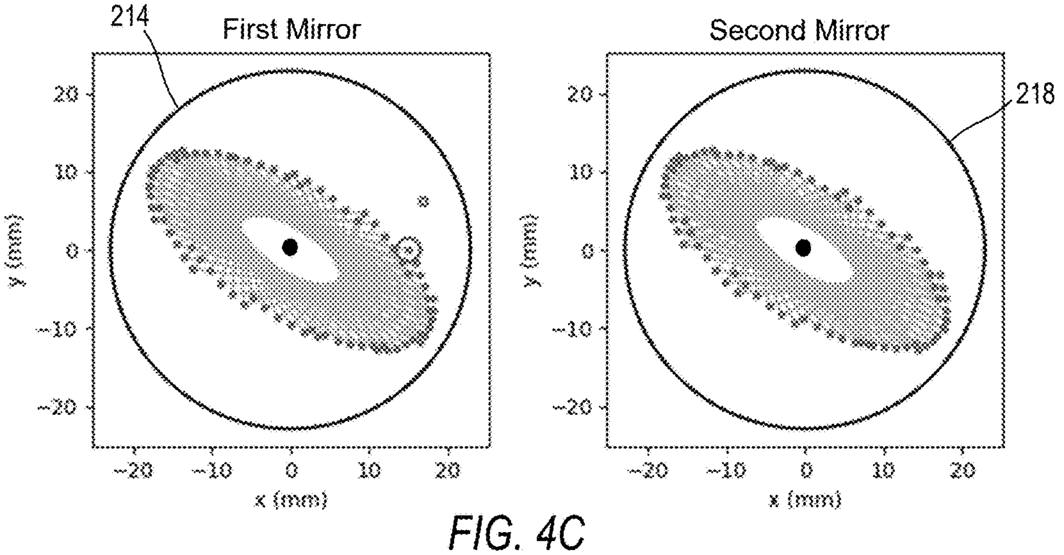
Figure 4D:
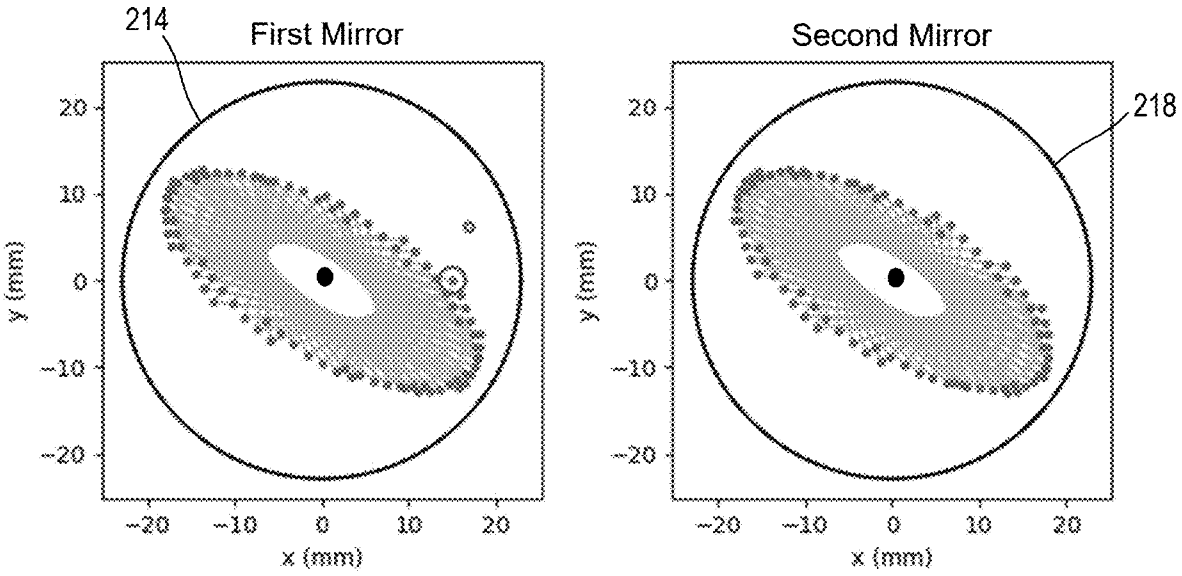
Figure 4E:
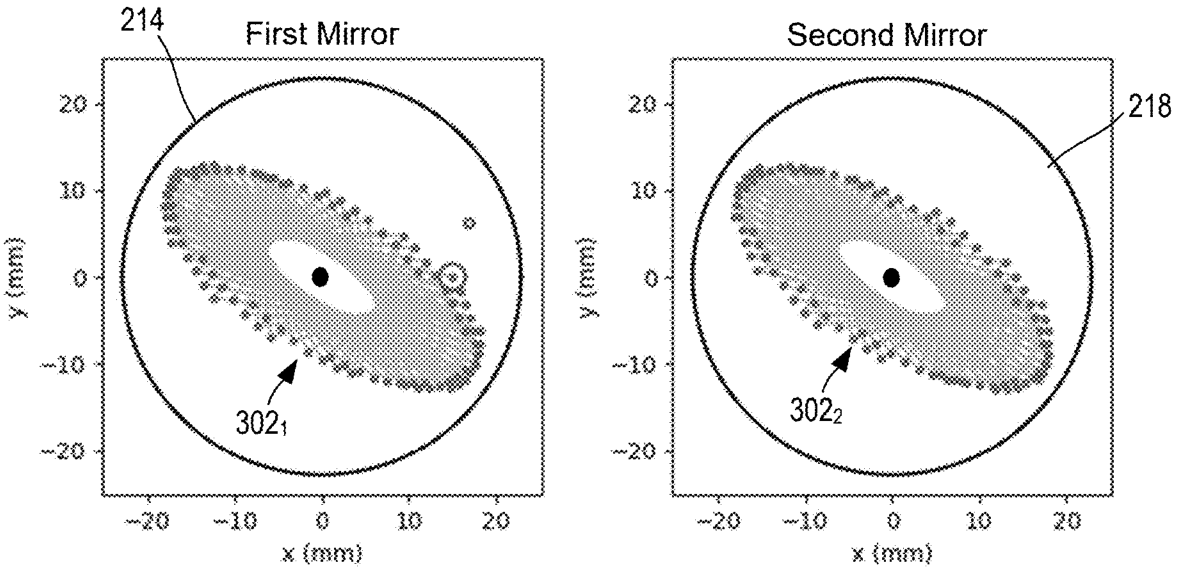

The reflections continue further as shown in FIG. 3C, where the next set of 10 reflections corresponding to spots $\mathbf{21}_1$ through $\mathbf{30}_1$ on the first mirror 214 and spots $\mathbf{21}_2$ through $\mathbf{30}_2$ on the second mirror 218 occur; and in FIG. 3D, where the next set of 10 reflections corresponding to spots $\mathbf{31}_1$ through $\mathbf{40}_1$ on the first mirror and spots $\mathbf{31}_2$ through $\mathbf{40}_2$ on the second mirror occur; and in FIG. 3E, where the last set of 10 reflections corresponding to spots $\mathbf{41}_1$ through $\mathbf{50}_1$ on the first mirror and spots $\mathbf{41}_2$ through $\mathbf{50}_2$ on the second mirror occur to complete the first looped spot pattern $\mathbf{301}_1$ on the first mirror 214 and the first looped spot pattern $\mathbf{301}_2$ on the second mirror 218. Again, for clarity in illustration not all spots are numbered in FIGS. 3C-3E.

With reference to FIGS. 4A-4E, a second set of reflections of the light beam between the first mirror 214 and the second mirror 218 results in a second looped spot pattern $\mathbf{302}_1$ on the first mirror 214 and a second looped spot pattern $\mathbf{302}_2$ on the second mirror 218. Similar to FIGS. 3A-3F, fifty reflections are included in the second set of reflections and are shown in FIGS. 4A-4F in increments of 10 reflections per mirror to illustrate that formation of the second looped spot patterns $\mathbf{302}_1$, $\mathbf{302}_2$ results from spots that generally cross back and forth from one half of the mirror to the other half as they form a looped spot pattern. Details on the reflections of the light beam 210 and corresponding spot and spot pattern formations are similar to those described with reference to FIGS. 3A-3E and are not repeated for FIGS. 4A-4E.

Figure 5A:
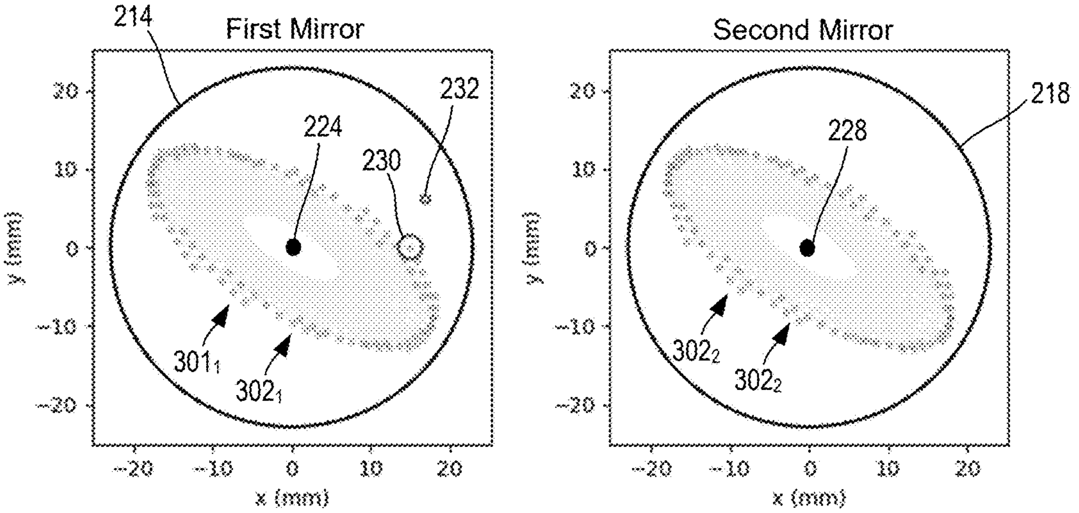
FIGS. 5A-5G are a sequence of illustrations showing two looped spot patterns (FIG. 5A), four looped spot patterns (FIG. 5B), ten looped spot patterns (FIG. 5C), twenty looped spot patterns (FIG. 5D), thirty looped spot patterns (FIG. 5E), forty looped spot patterns (FIG. 5F), and fifty looped spot patterns (FIG. 5G) on a first mirror and a second mirror of a multipass cell.

With reference to FIG. 5A, the first looped spot pattern $\mathbf{301}_1$ and the second looped spot pattern $\mathbf{302}_1$ are shown on the first mirror 214, and the first looped spot pattern $\mathbf{301}_2$ and the second looped spot pattern $\mathbf{302}_2$ are shown on the second mirror 218. For clarity in illustration, the connecting lines between spots included in FIGS. 3A-4E are not included in FIG. 5A and similar figures that follow.

Figure 5B:
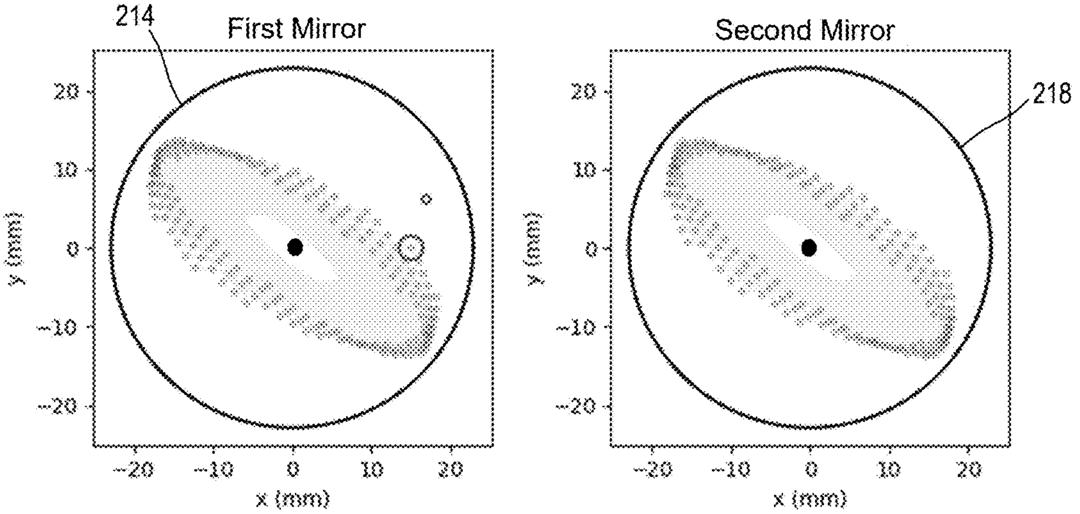

In FIG. 5B, a third looped spot pattern and a fourth looped spot pattern resulting from continued intracavity reflections of the light beam 210 are added to the spot patterns of FIG. 5A. These additional looped spot patterns are formed in a manner similar to the first looped spot pattern and the second looped spot pattern. Note, for clarity of illustration, the third and fourth looped spot patterns are not labeled in FIG. 5B.

Figure 5C:
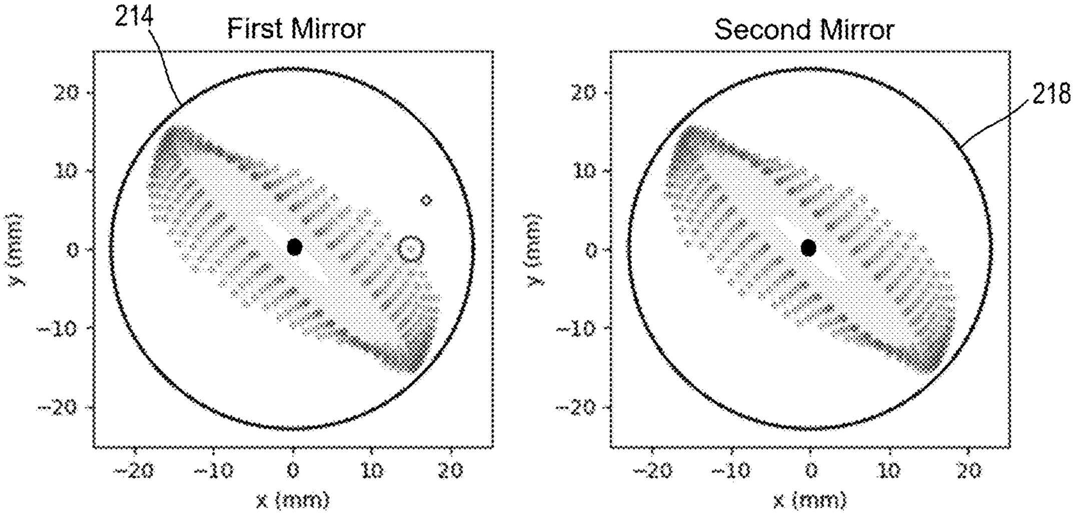

In FIG. 5C, fifth through tenth looped spot patterns resulting from continued intracavity reflections of the light beam 210 are added to the spot patterns of FIG. 5B. These additional looped spot patterns are formed in a manner similar to the first looped spot pattern and the second looped spot pattern. Note, for clarity of illustration, the fifth through tenth looped spot patterns are not labeled in FIG. 5C.

Figure 5D:
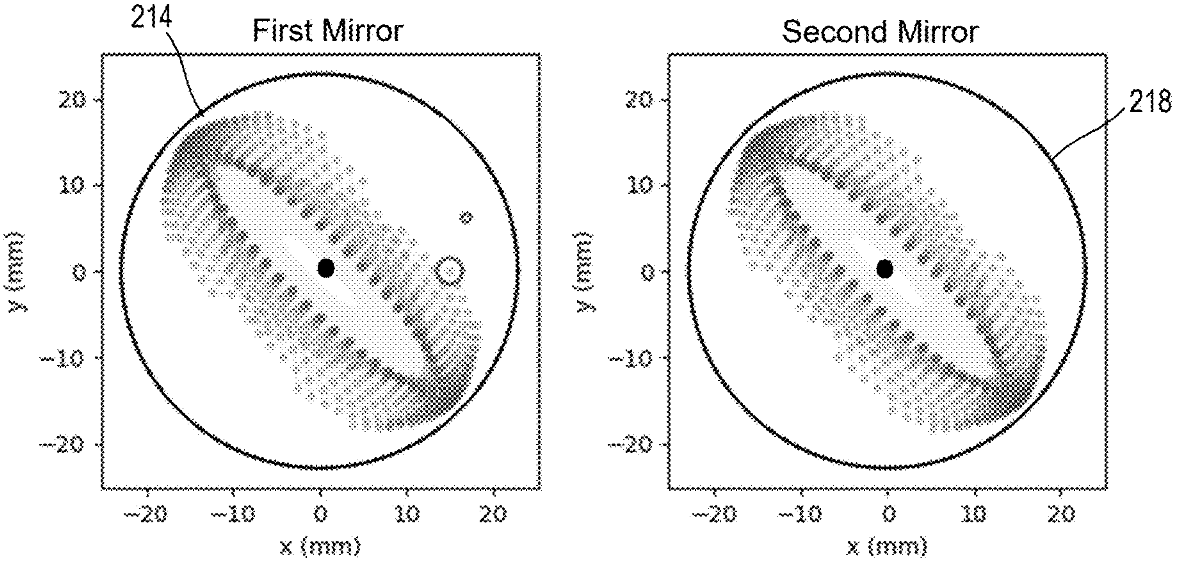

In FIG. 5D, eleventh through twentieth looped spot patterns resulting from continued intracavity reflections of the light beam 210 are added to the spot patterns of FIG. 5C. These additional looped spot patterns are formed in a manner similar to the first looped spot pattern and the second looped spot pattern. Note, for clarity of illustration, the eleventh through twentieth looped spot patterns are not labeled in FIG. 5D.

Figure 5E:
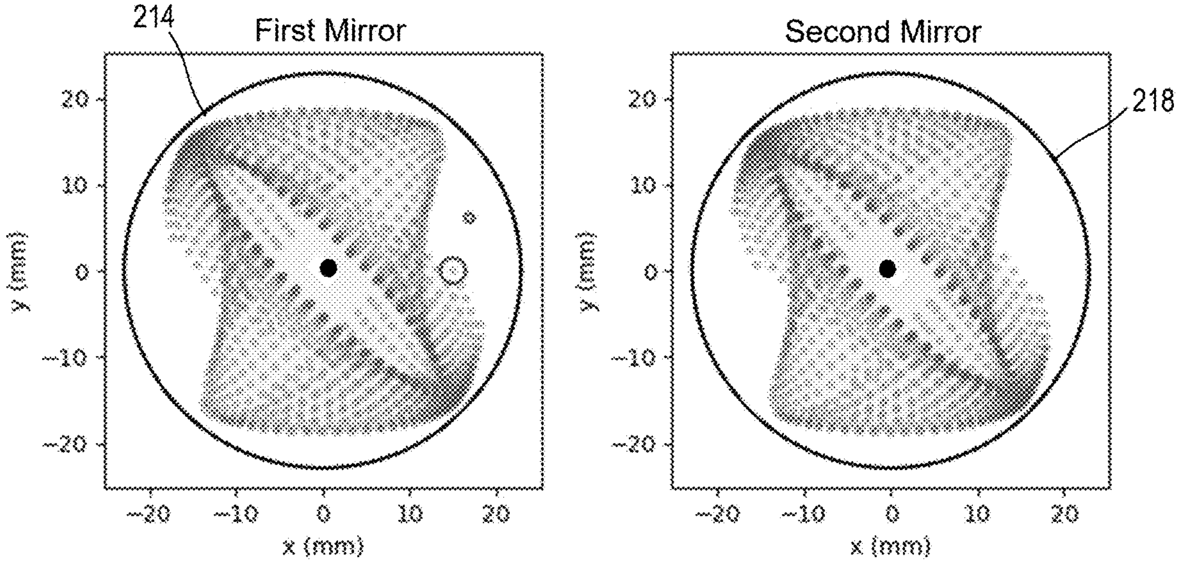

In FIG. 5E, twenty-first through thirtieth looped spot patterns resulting from continued intracavity reflections of the light beam 210 are added to the spot patterns of FIG. 5D. These additional looped spot patterns are formed in a manner similar to the first looped spot pattern and the second looped spot pattern. Note, for clarity of illustration, the twenty-first through thirtieth looped spot patterns are not labeled in FIG. 5E.

Figure 5F:
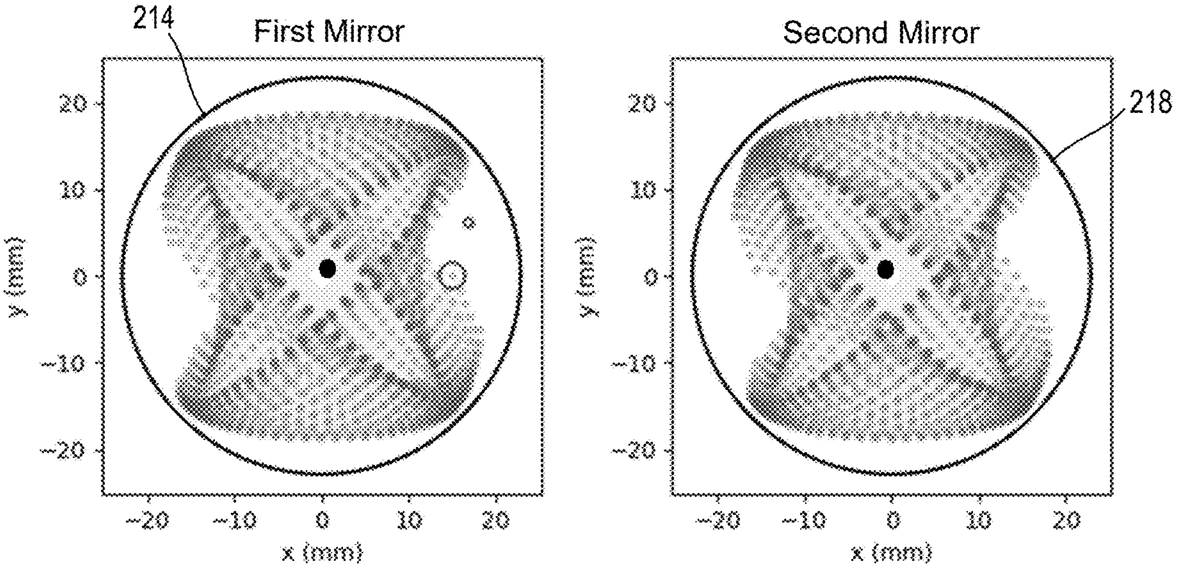

In FIG. 5F, thirty-first through fortieth looped spot patterns resulting from continued intracavity reflections of the light beam 210 are added to the spot patterns of FIG. 5E. These additional looped spot patterns are formed in a manner similar to the first looped spot pattern and the second looped spot pattern. Note, for clarity of illustration, the thirty-first through fortieth looped spot patterns are not labeled in FIG. 5F.

Figure 5G:
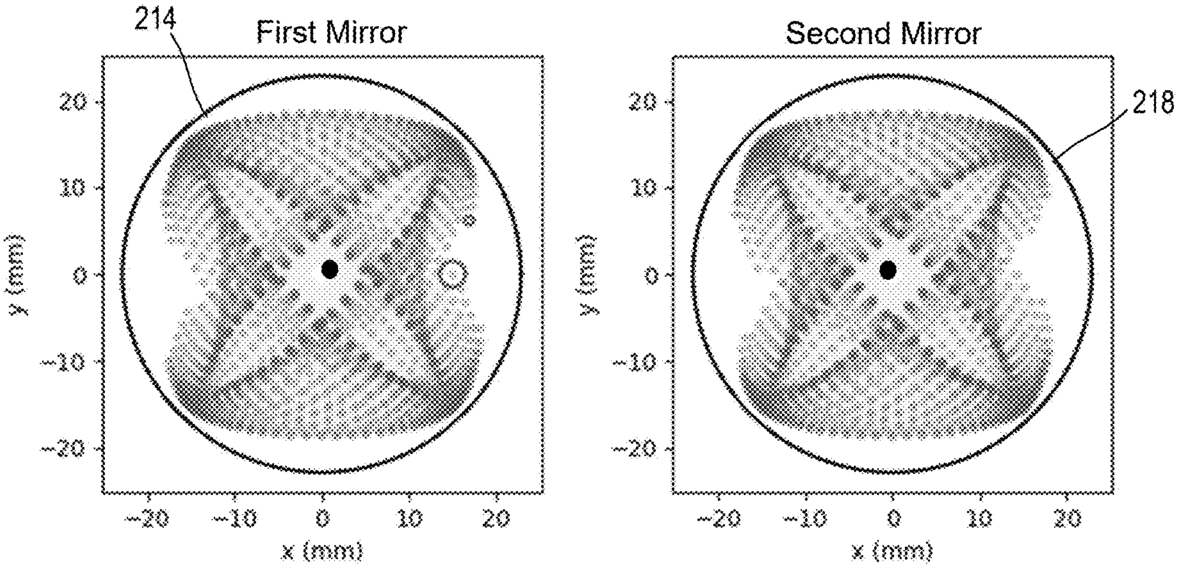

In FIG. 5G, forty-first through fiftieth looped spot patterns resulting from continued intracavity reflections of the light beam 210 are added to the spot patterns of FIG. 5F. These additional looped spot patterns are formed in a manner similar to the first looped spot pattern and the second looped spot pattern. During formation of the fiftieth looped spot pattern the central ray of the light beam 210 exits the optical cavity 226 through the collection aperture 232. Note, for clarity of illustration, the forty-first through fiftieth looped spot patterns are not labeled in FIG. 5G.

Figure 6A:
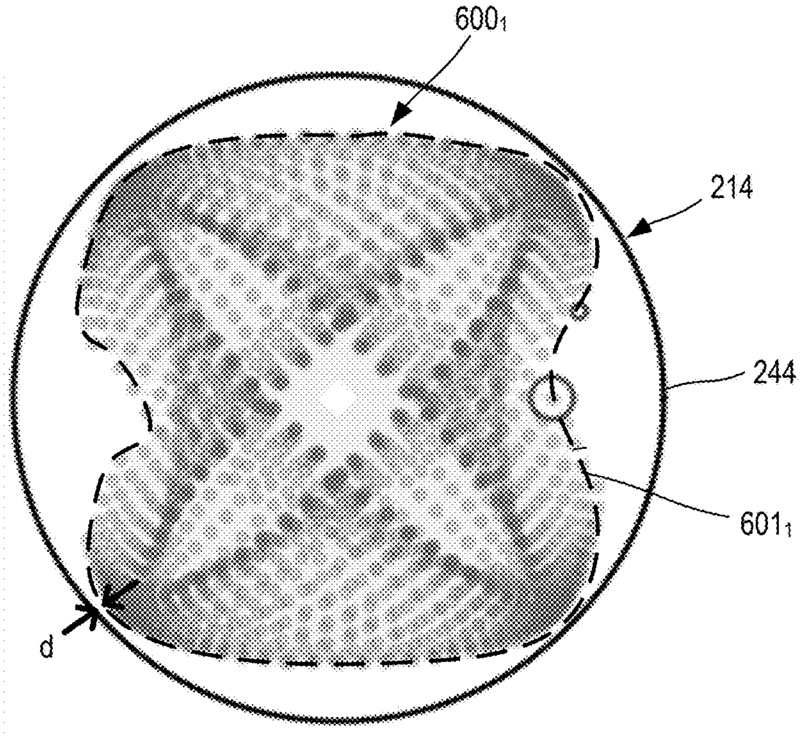
FIGS. 6A and 6B are illustrations of a final, cumulative spot pattern on a first mirror (FIG. 6A) and a final, cumulative spot pattern on a second mirror (FIG. 6B) corresponding to the fifty looped spot patterns of FIG. 5G.
Figure 6B:
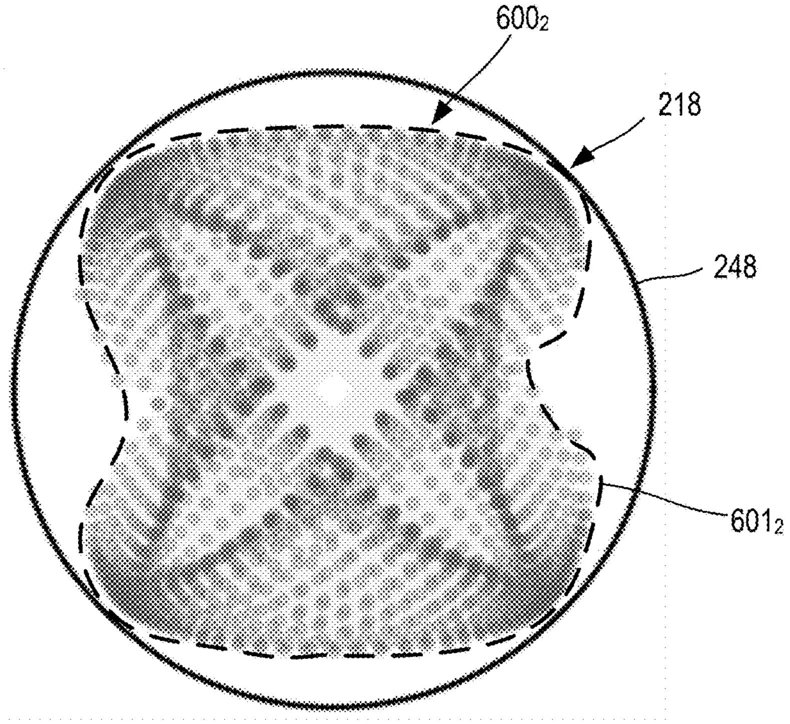

Thus, with reference to FIGS. 6A and 6B, this configuration of the optical system 200 provides for intracavity propagation of a light beam 210 that produces a final, cumulative spot pattern $\mathbf{600}_1$ on a first mirror 214, and a final, cumulative spot pattern $\mathbf{600}_2$ on a second mirror 218. The respective cumulative spot patterns $\mathbf{600}_1$, $\mathbf{600}_2$ correspond to the fifty looped spot patterns of FIG. 5G. The propagation path length of this configuration is approximately 800 meters.

In comparing the cumulative spot patterns $\mathbf{600}_1$, $\mathbf{600}_2$ to those produced by prior multipass cells, such as shown in FIGS. 17A-17D, it is noted that the cumulative spot patterns $\mathbf{600}_1$, $\mathbf{600}_2$ are denser. For example, the spots forming the cumulative spot patterns $\mathbf{600}_1$, $\mathbf{600}_2$ in FIGS. 6A and 6B have an average density of about 5 spots per 1 millimeter (mm) squared, while the spots forming the spot patterns in prior multipass cells have average densities in the range of about 1 spot per 10 $mm^2$.

Each of the dense cumulative spot patterns $\mathbf{600}_1$, $\mathbf{600}_2$ has a perimeter boundary that covers a larger proportion or fraction of the surface of the mirror compared to prior multipass cells. For example, for each of the mirrors 214, 218, the surface area of the mirror that is bounded by the perimeter $\mathbf{601}_1$, $\mathbf{601}_2$, of the cumulative spot patterns $\mathbf{600}_1$, $\mathbf{600}_2$ covers about 90% of the total surface area of the mirror 214, 218, while the boundaries of the spot patterns in prior multipass cells only cover as little as 10%. Because the full area of the mirror is used, the standard limitation of spot overlap is removed or relaxed, and many more passes can be achieved.

Furthermore, the spots at the perimeters $\mathbf{601}_1$, $\mathbf{601}_2$ of the cumulative spot patterns $\mathbf{600}_1$, $\mathbf{600}_2$ more closely approach the edge 244, 248 of the mirror. For example, for each of the mirrors 214, 218, some spots near the perimeter $\mathbf{601}_1$, $\mathbf{601}_2$ are within a distance d of the edge 244, 248 of the mirror, where d is about 0.1 times the beam diameter, while in the spot patterns of prior multipass cells, the spots closest to the perimeter of the spot patterns are a distance from the edge, which distance is greater than d.

Figure 7B:
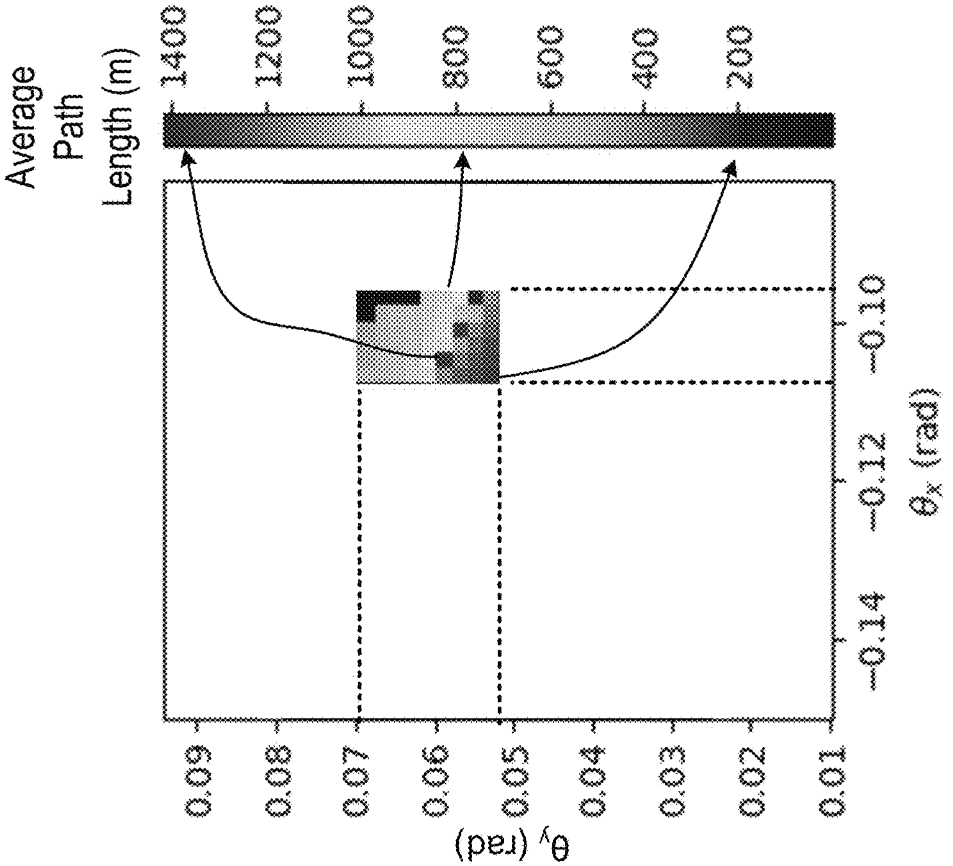
FIG. 7B is a graph of the average intracavity path length of a light beam for the first configuration of the multipass cell, as a function of the injection angle ($\theta_x$, $\theta_y$) of the light beam.
Figure 7A:
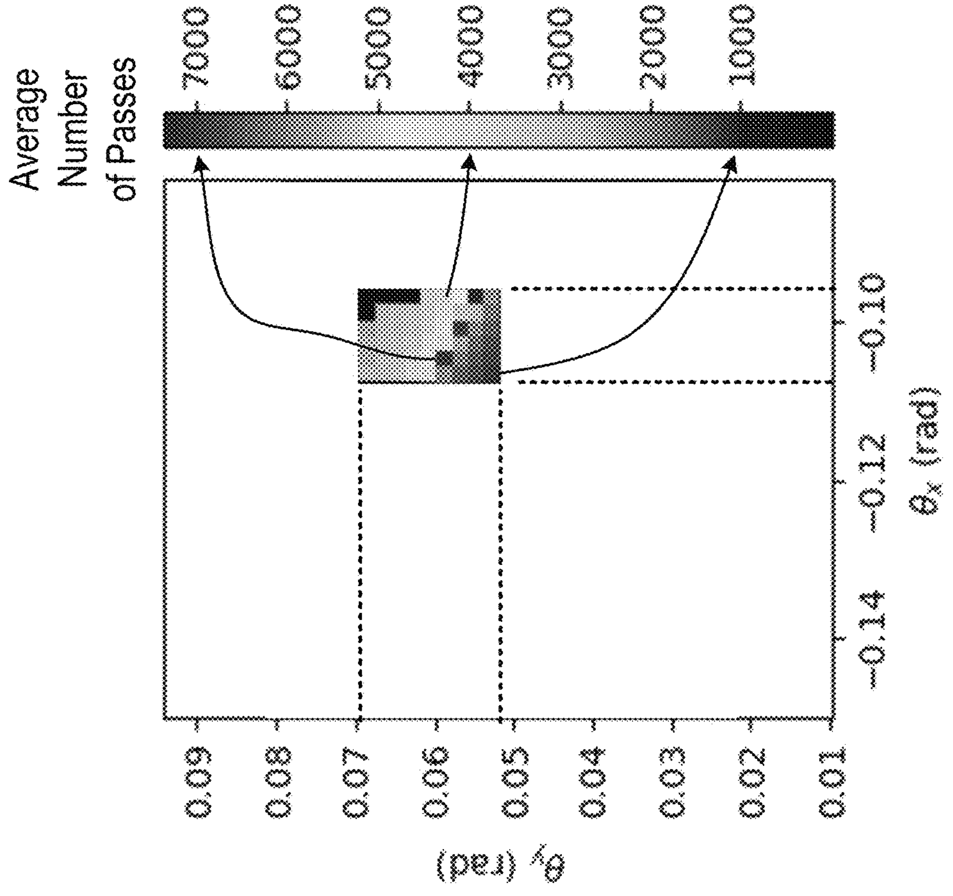
FIG. 7A is a graph of the average number of intracavity passes of a light beam for a first configuration of a multipass cell, as a function of the injection angle (θx, y) of the light beam.

FIGS. 7A and 7B respectively present the average number of passes of a light beam and the average path length across an example range of injection angles for a multipass cell 204 configured as specified above. While numbers and lengths for injection angles outside of the example range have been obtained, for clarity of illustration those results have been redacted from the color (grayscale) map of FIGS. 7A and 7B.

With reference to FIG. 7A, injection angles with $\theta_x$ in the range of −0.108 radians to −0.075 radians and $\theta_y$ in the range of 0.052 radians and 0.070 radians provide an average number of passes in the range of 1000-7000 as indicated by color (or grayscale) matches between the squares within the $\theta_x$ by $\theta_y$ grid and the side bar in the figure. With reference to FIG. 7B, injection angles with $\theta_x$ in the range of −0.108 radians to −0.075 radians and $\theta_y$ in the range of 0.052 radians and 0.070 radians provide an average path length in the range of 200-1400 meters as indicated by color (or grayscale) matches between the squares within the $\theta_x$ by $\theta_y$ grid and the side bar in the figure.

Figure 7D:
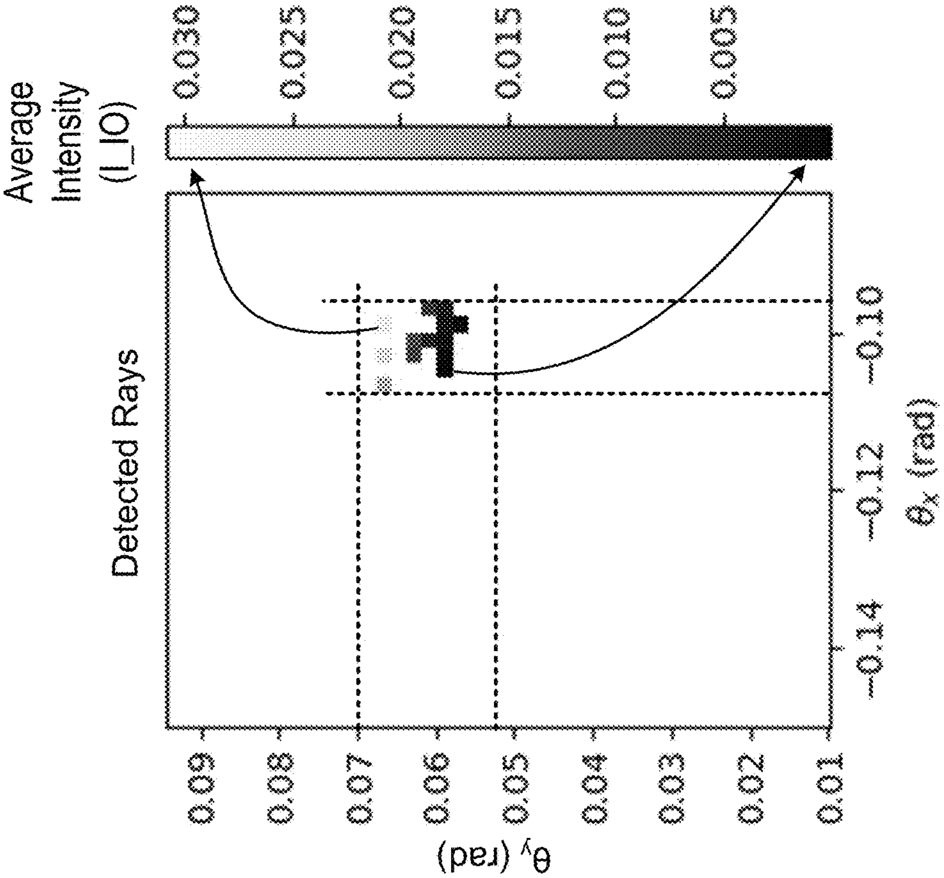
FIG. 7D is a graph of the average intensity of a detected light beam for the first configuration of the multipass cell, as a function of the injection angle ($\theta_x$, $\theta_y$) of the light beam.
Figure 7C:
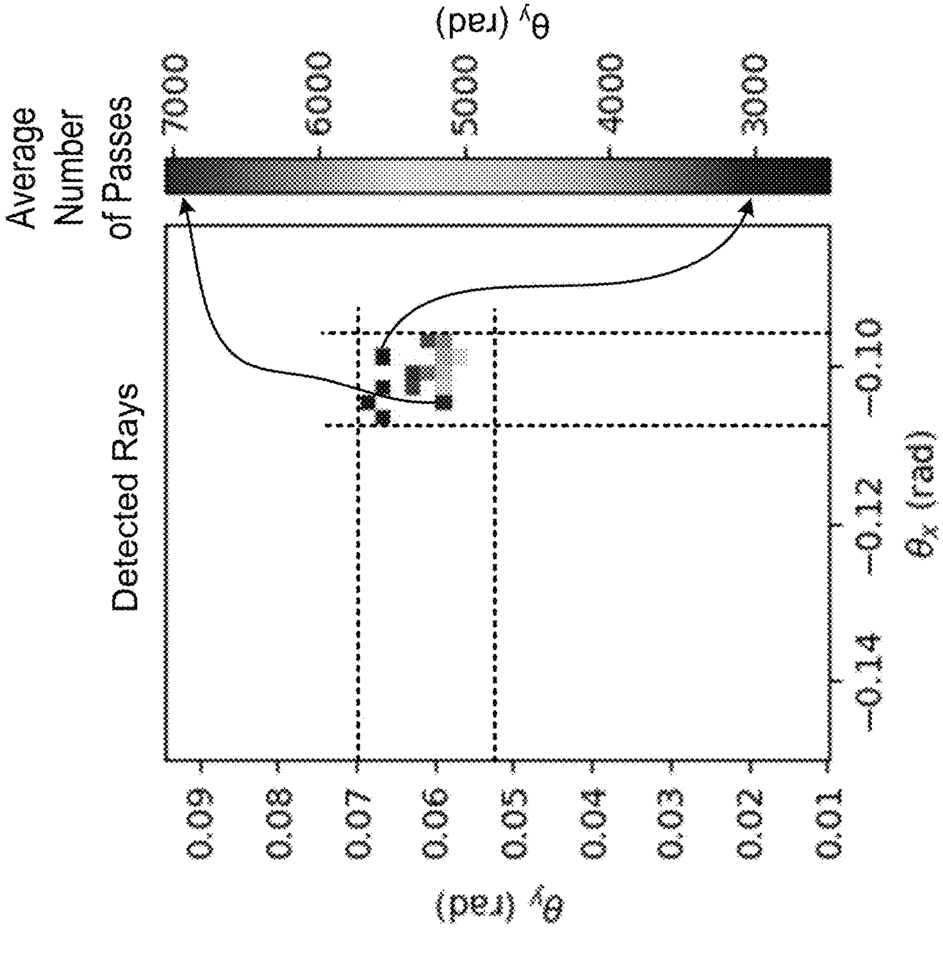
FIG. 7C is a graph of the average number of intracavity passes for a detected light beam for the first configuration of the multipass cell, as a function of the injection angle ($\theta_x$, $\theta_y$) of the light beam.

FIGS. 7C and 7D respectively present the average number of passes of a detected light beam and the average intensity of a detected beam across an example range of injection angles for a multipass cell 204 configured as specified above. While numbers and intensities for injection angles outside of the example range have been obtained, for clarity of illustration those results have been redacted from the color (grayscale) map of FIGS. 7C and 7D.

With reference to FIG. 7C, injection angles with $\theta_x$ in the range of −0.108 radians to −0.075 radians and $\theta_y$ in the range of 0.052 radians and 0.070 radians provide an average number of passes in the range of 3000-7000 as indicated by color (or grayscale) matches between the squares within the $\theta_x$ by $\theta_y$ grid and the side bar in the figure. With reference to FIG. 7D, injection angles with $\theta_x$ in the range of −0.108 radians to −0.075 radians and $\theta_y$ in the range of 0.052 radians and 0.070 radians provide an average intensity in the range of near zero to 0.030 as indicated by color (or grayscale) matches between the squares within the $\theta_x$ by $\theta_y$ grid and the side bar in the figure.

With reference to FIGS. 2A, 6A, 6B, and 8A-8C, disclosed herein is an optical system 200 having a multipass cell 204, a light source 202, and a detector 208. The multipass cell 204 includes an optical cavity 226 between respective surfaces of a first mirror 214 and a second mirror 218 spaced apart from the first mirror 214. A central axis 222 extends through a center 224 of the first mirror and a center 228 of the second mirror. The multipass cell 204 also includes an injection aperture 230 through the first mirror and a collection aperture 232. The light source 202 is arranged relative to the multipass cell 204 to output a light beam 210 along an injection path at an injection angle ($\theta_x$, $\theta_y$) through the injection aperture 230 into the optical cavity 226. The detector 208 is arranged relative to the collection aperture 232 to receive the light beam 210.

The multipass cell 204 and the injection angle ($\theta_x$, $\theta_y$) are configured such that the light beam 210 propagates back-and-forth between the first mirror 214 and the second mirror 218 to form a cumulative spot pattern $\mathbf{600}_1$ on the first mirror before exiting the optical cavity 226 through the collection aperture 232. This back and forth propagation of the light beam 210 is referred to as intracavity propagation. With reference to FIGS. 6A and 8B, the cumulative spot pattern $\mathbf{600}_1$ on the first mirror 214 is a accumulation of a plurality $N_1$ of individual looped spot patterns $\mathbf{301}_1$, $\mathbf{302}_1$, $\mathbf{303}_1$, $\mathbf{304}_1$, where each looped spot pattern extends 360 degrees around the center 224 of the first mirror. In FIG. 8B, overlays are added to show that the each of the four looped spot patterns $\mathbf{301}_1$, $\mathbf{302}_1$, $\mathbf{303}_1$, $\mathbf{304}_1$, approximate an ellipse-more specifically, a non-circular ellipse.

Figure 8A:
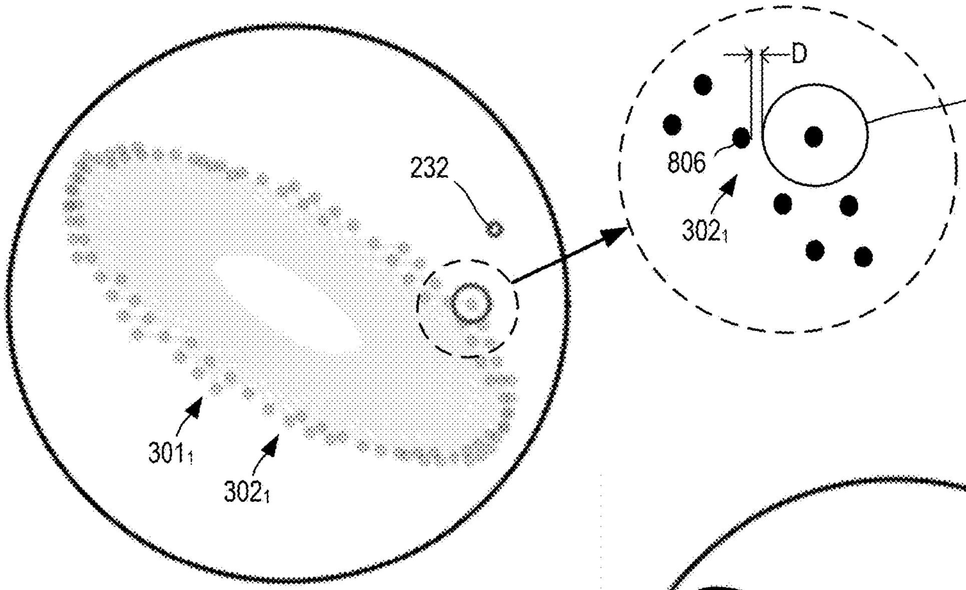
FIG. 8A is an illustration of the two looped spot patterns of FIG. 5A with a detail showing the spot of the second looped spot pattern that is closest to the injection aperture avoids exiting through the aperture by at least a distance D.
Figure 8B:
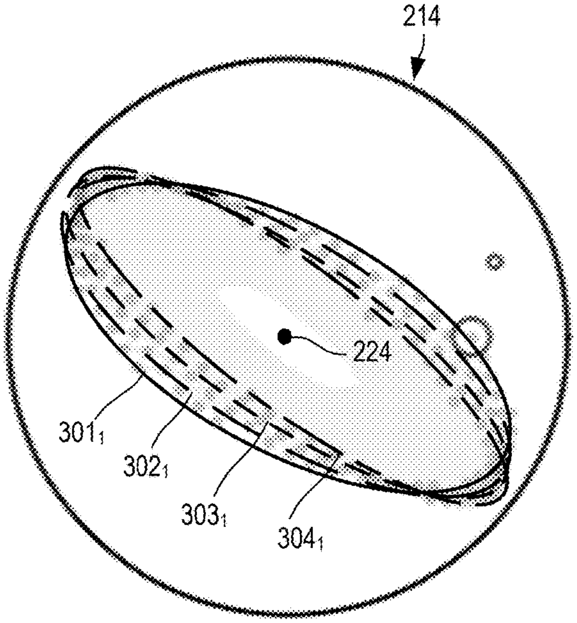
FIG. 8B is an illustration of the four looped spot patterns of FIG. 5B with overlays showing that each of the looped spot patterns approximates an ellipse.
Figure 8C:
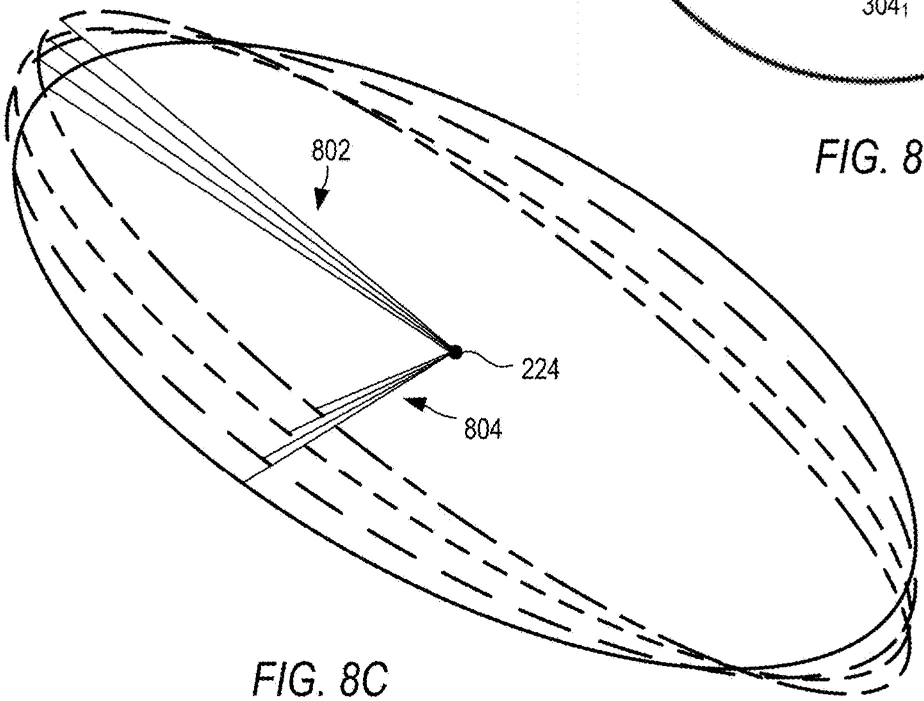
FIG. 8C is a detailed illustrations of the overlays of FIG. 8B showing a precession of the ellipses on the mirror as observed in the direction of the center of the mirror.

With reference to FIGS. 8B and 8C, the overlays of the plurality of individual looped spot patterns $\mathbf{301}_1$, $\mathbf{302}_1$, $\mathbf{303}_1$, $\mathbf{304}_1$ show a precession of individual looped spot patterns on the surface of the first mirror 214. Precession in this context means that, when viewed in the direction of the surface of the mirror 214, each ellipse in the sequence of ellipses rotates slightly around the center 224 of the mirror. In some embodiments, during precession the major axis 802 of the ellipse lengthens and the minor axis 804 shortens. As precessions of the ellipse continues, the ellipse reaches an end size having a maximum major axis and a minimum minor axis, and then the dimensions of the ellipse begin to change in reverse, with the major axis decreasing while the minor axis increase. In some embodiments, during precession the minor axis shortens with minimal change in the major axis. As precessions of the ellipse continues, the ellipse reaches an end size having a minimum minor axis, and then the minor axis begins to increase.

With reference to FIG. 8A, because of this precession, the spots forming the second looped spot pattern 302$_1$ avoid an aperture. More specifically, the spot 806 of the second looped spot pattern 302$_1$ that is nearest to an aperture 230 deviates from edge of that aperture by a distance D, where D is greater than 0.1 of the diameter of the aperture. As precession of the individual looped spot pattern 303$_1$, 304$_1$ continues, for each subsequent individual spot pattern through to and including the penultimate looped spot pattern, the spot nearest to an aperture deviates from the edge of that aperture by a distance D, where D is greater than 0.1 of the diameter of the collection aperture.

As shown in FIG. 6B, intracavity propagation of the light beam 210 also forms a cumulative spot pattern 600$_2$ on the second mirror. Like the cumulative spot pattern 600$_1$ on the first mirror 214, the cumulative spot pattern 600$_2$ on the second mirror 218 is a accumulation of a precession of a plurality $N_2$ of individual looped spot patterns, where each looped spot pattern extends 360 degrees around the center 228 of second first mirror, and the spot nearest to an aperture (if any on the second mirror) deviates from the edge of that aperture by a distance D, where D is greater than 0.1 of the diameter of the collection aperture.

Second Example Configuration

In a second example, an optical system 200 having a multipass cell 204 having a short physical cell length, a pair of non-astigmatic mirrors, each with a large radius of curvature, and a large diameter, and an injection angle ($\theta_x$, $\theta_y$) specified as follows provides a propagation path length of approximately 550 meters:

- first mirror 214=2.54 cm (2 inch) diameter with a radius of curvature (ROC) of 300 mm;
- second mirror 218=2.54 cm (2 inch) diameter with a ROC of 300 mm;
- cavity length (L)=210.7 mm;
- injection angle ($\theta_x$, $\theta_y$)=(−0.100, 0.57) radians;
- injection aperture 230=3 mm diameter, located 15 mm from the center 224 of the first mirror 214;
- collection aperture 232=1 mm diameter, located 15 mm from the center 224 of the first mirror, but rotated by +10 degrees relative to the injection aperture 230.

Figure 9A:
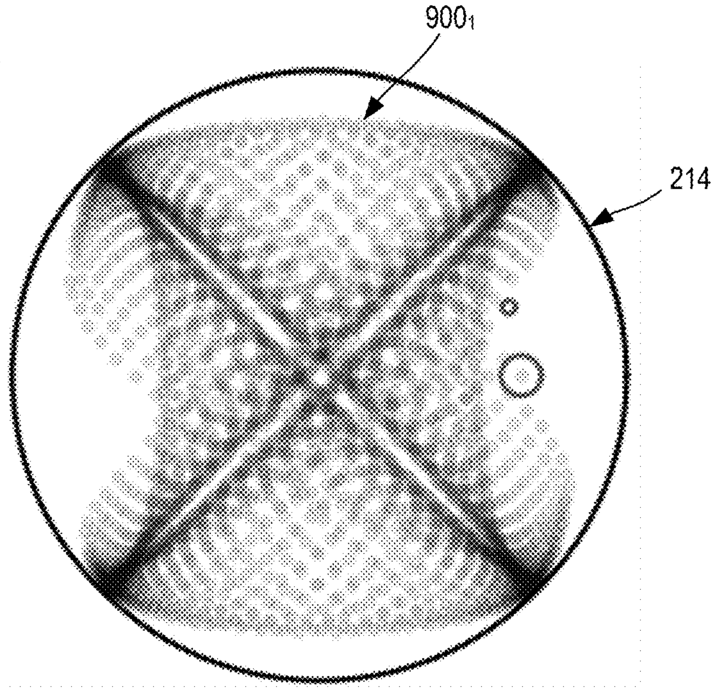
FIGS. 9A and 9B are illustrations of a final, cumulative spot pattern on a first mirror (FIG. 9A) and a final, cumulative spot pattern on a second mirror (FIG. 9B) resulting from intracavity reflections of a light beam between a first mirror and a second mirror of a second configuration of the multipass cell of FIG. 2A.
Figure 9B:
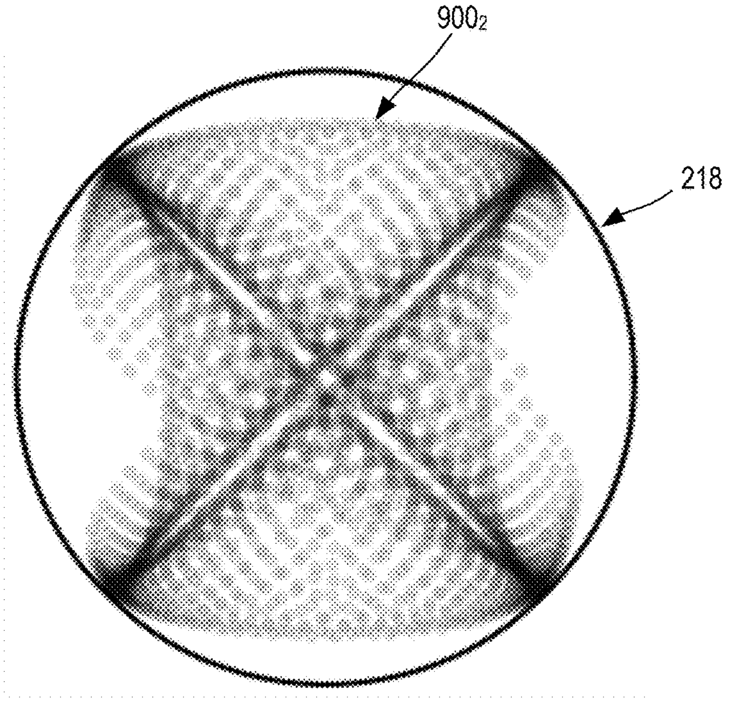

With reference to FIGS. 9A and 9B, this example of an optical system 200 results in a cumulative spot pattern 900$_1$ on a first mirror 214 and a cumulative spot pattern 900$_2$ on a second mirror 218. Like the cumulative spot patterns of FIGS. 6A and 6B, the cumulative spot patterns 900$_1$, 900$_2$ in FIGS. 9A and 9B are accumulations of fifty individual looped spot patterns, each comprising fifty spots.

Figure 10B:
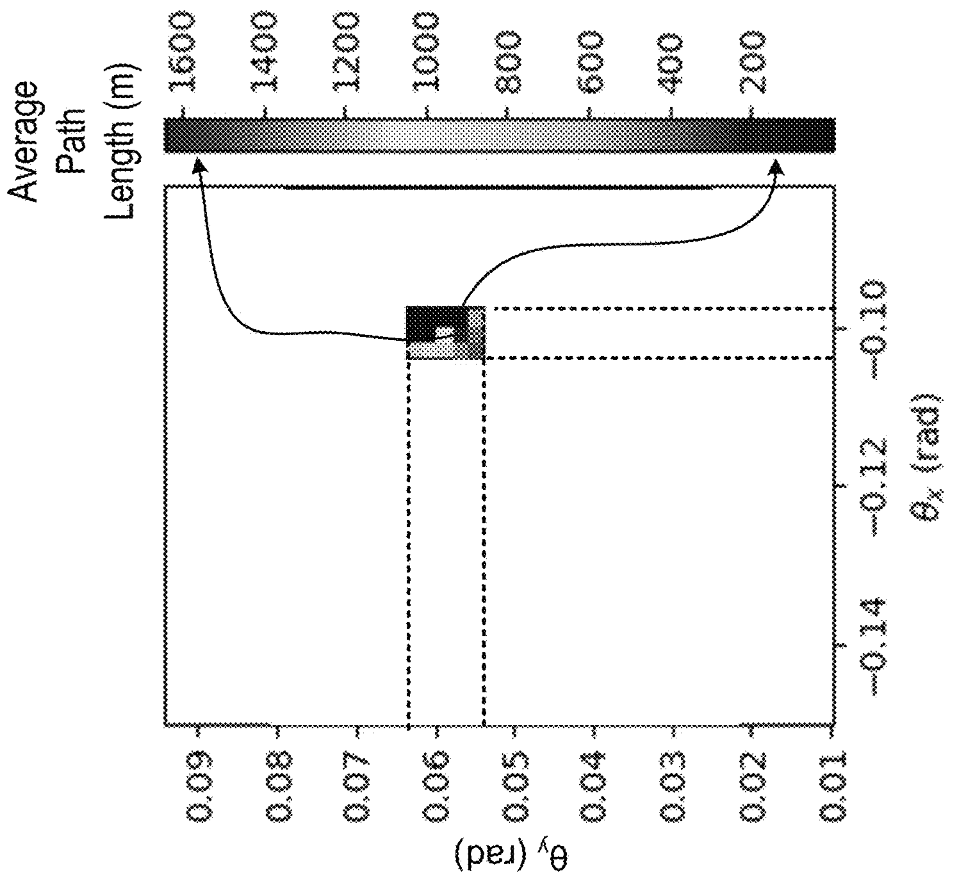
FIG. 10B is a graph of the average intracavity path length of a light beam for the second configuration of the multipass cell, as a function of the injection angle ($\theta_x$, $\theta_y$) of the light beam.
Figure 10A:
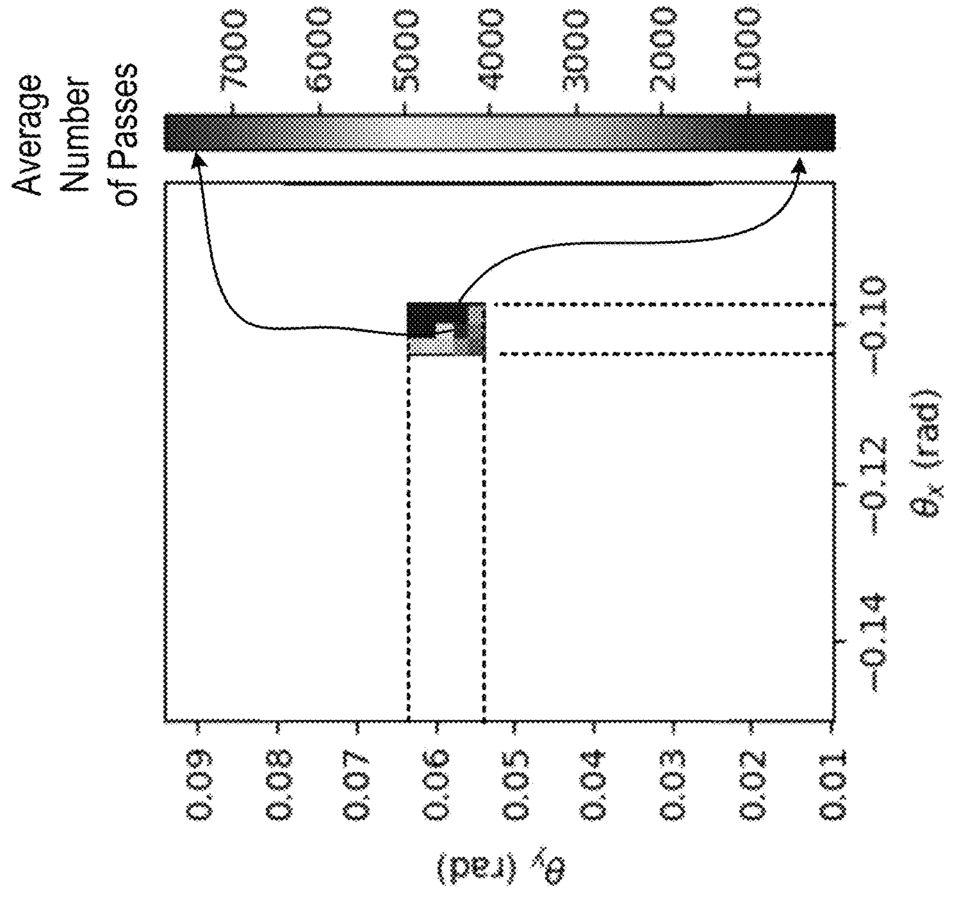
FIG. 10A is a graph of the average number of intracavity passes of a light beam for the second configuration of a multipass cell, as a function of the injection angle ($\theta_x$, $\theta_y$) of the light beam.

FIGS. 10A and 10B respectively present the average number of passes of a light beam and the average path length across an example range of injection angles for a multipass cell 204 configured as specified above. While numbers and lengths for injection angles outside of the example range have been obtained, for clarity of illustration those results have been redacted from the color (grayscale) map of FIGS. 10A and 10B.

With reference to FIG. 10A, injection angles with $\theta_x$ in the range of −0.105 radians to −0.098 radians and $\theta_y$ in the range of 0.056 radians and 0.063 radians provides an average number of passes in the range of 500-7500 as indicated by color (or grayscale) matches between the squares within the $\theta_x$ by $\theta_y$ grid and the side bar in the figure. With reference to FIG. 10B, injection angles with $\theta_x$ in the range of −0.105 radians to −0.098 radians and $\theta_y$ in the range of 0.056 radians and 0.063 radians provide an average path length in the range of 100-1600 meters as indicated by color (or grayscale) matches between the squares within the $\theta_x$ by $\theta_y$ grid and the side bar in the figure.

Figure 10D:
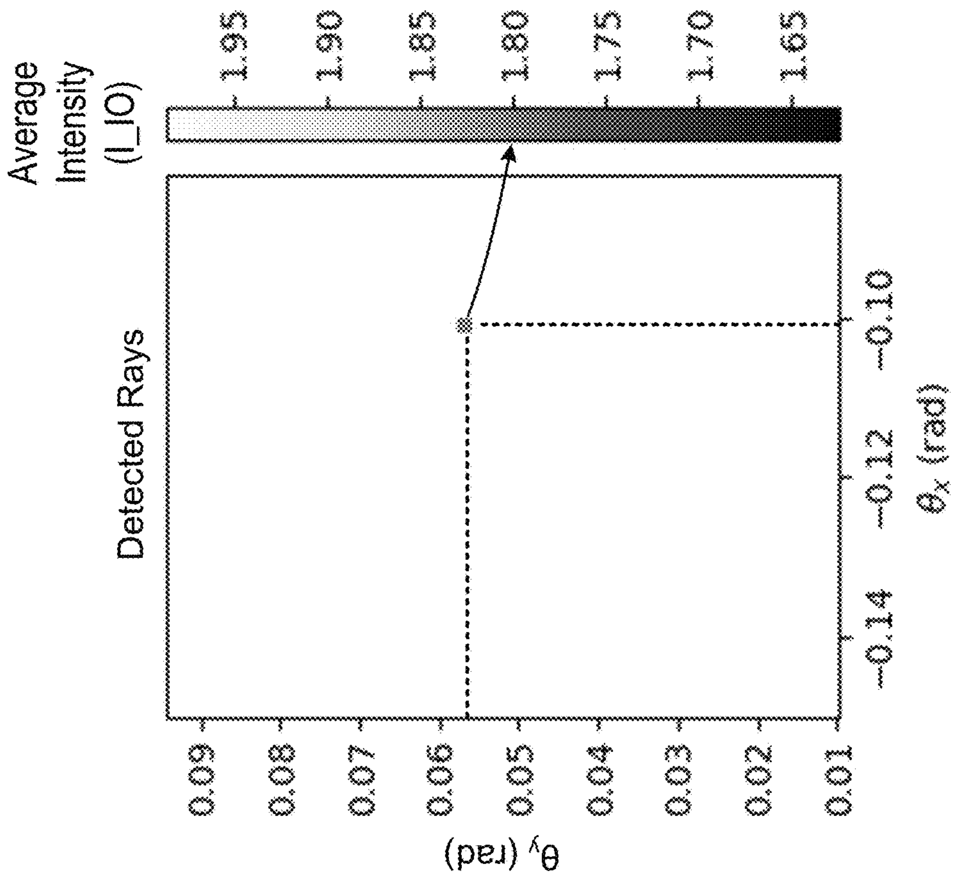
FIG. 10D is a graph of the average intensity of a detected light beam for the second configuration of the multipass cell, as a function of the injection angle ($\theta_x$, $\theta_y$) of the light beam.
Figure 10C:
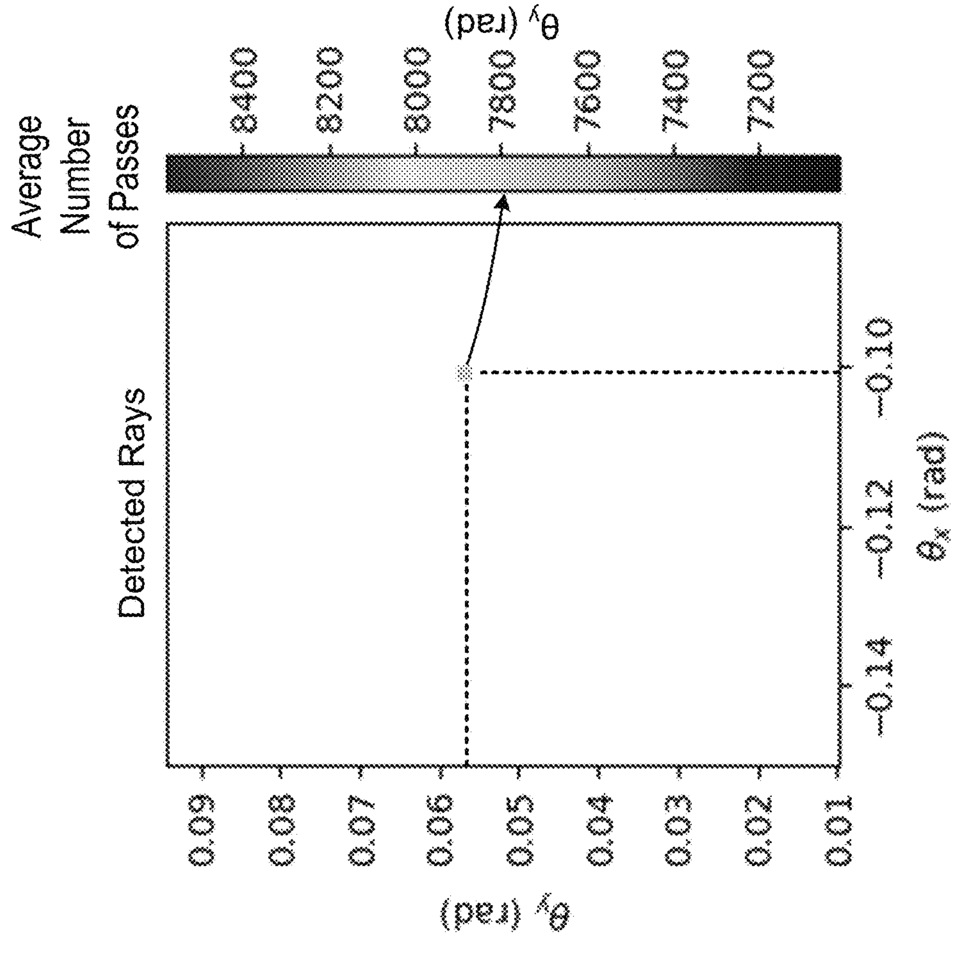
FIG. 10C is a graph of the average number of intracavity passes for a detected light beam for the second configuration of the multipass cell, as a function of the injection angle ($\theta_x$, $\theta_y$) of the light beam.

FIGS. 10C and 10D respectively present the average number of passes of a detected light beam and the average intensity of a detected beam for a specific injection angle for a multipass cell 204. While numbers and intensities for injection angles other than the specific example have been obtained, for clarity of illustration those results have been redacted from the color (grayscale) map of FIGS. 10C and 10D.

With reference to FIG. 10C, an injection angle with a $\theta_x$ of −0.101 and a $\theta_y$ of 0.057 provides an average number of passes of about 7800. With reference to FIG. 10D, an injection angle with a $\theta_x$ of −0.101 and $\theta_y$ of 0.057 radians provides an average intensity of about 1.8.

Third Example Configuration

In a third example, an optical system 200 having a multipass cell 204 having a short physical cell length, a pair of non-astigmatic mirrors, each with a large radius of curvature, and a large diameter, and an injection angle ($\theta_x$, $\theta_y$) specified as follows provides a propagation path length of approximately 500 meters:

- first mirror 214=2.54 cm (2 inch) diameter with a radius of curvature (ROC) of 300 mm;
- second mirror 218=2.54 cm (2 inch) diameter with a ROC of 300 mm;
- cavity length (L)=204 mm;
- injection angle ($\theta_x$, $\theta_y$)=(−0.096, 0.054) radians;
- injection aperture 230=3 mm diameter, located 15 mm from the center 224 of the first mirror 214;
- collection aperture 232=1 mm diameter, located 15 mm from the center 224 of the first mirror, but rotated by +30 degrees relative to the injection aperture 230;
- injected light beam 210=has a gaussian profile with a 1/e width of 0.225 mm and is focused 1000 mm from the light source 202.

Figure 11A:
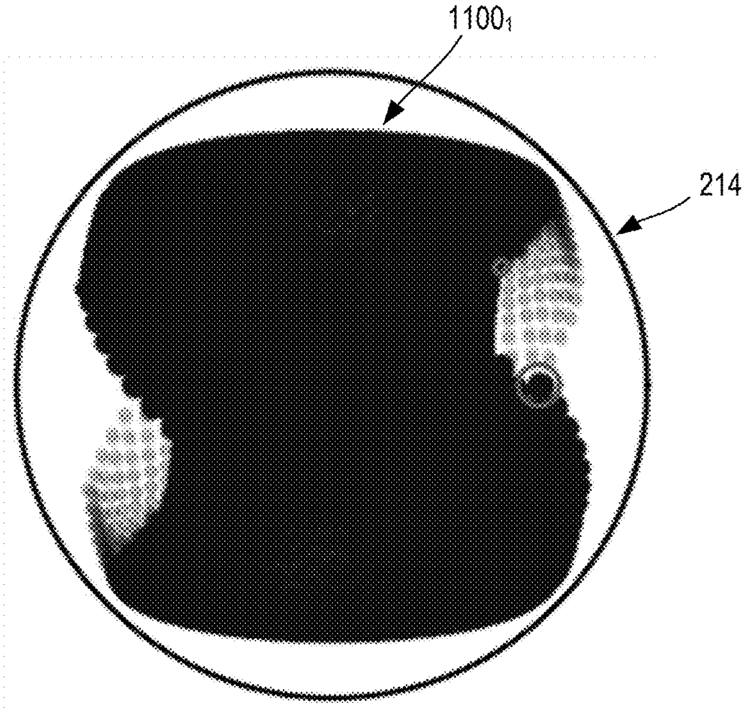
FIGS. 11A and 11B are illustrations of a final, cumulative spot pattern on a first mirror (FIG. 11A) and a final, cumulative spot pattern on a second mirror (FIG. 11B) resulting from intracavity reflections of a light beam between a first mirror and a second mirror of a third configuration of the multipass cell of FIG. 2A.
Figure 11B:
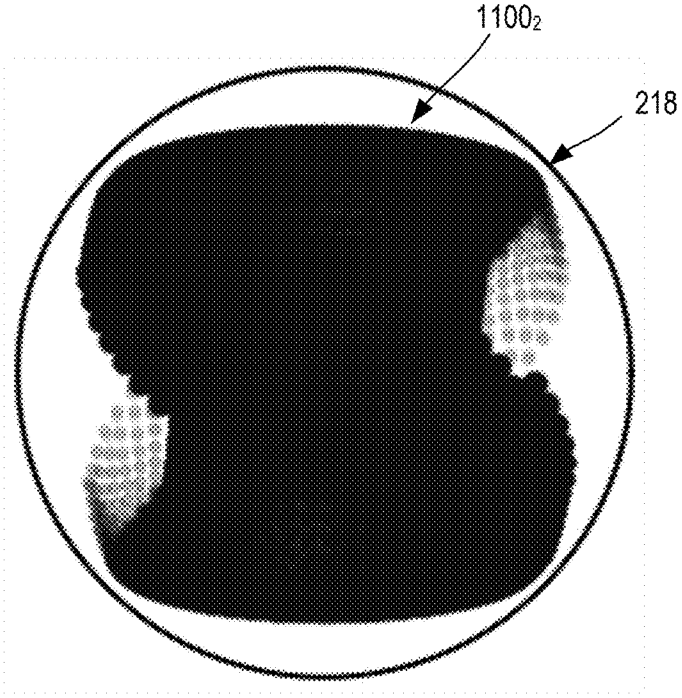

With reference to FIGS. 11A and 11B, this example of an optical system 200 results in a cumulative spot pattern 1100$_1$ on a first mirror 214 and a cumulative spot pattern 1100$_2$ on a second mirror 218. Like the cumulative spot patterns of FIGS. 6A and 6B, the cumulative spot patterns 1100$_1$, 1100$_2$ in FIGS. 9A and 9B are accumulations of fifty individual looped spot patterns, each comprising fifty spots.

Figure 12A:
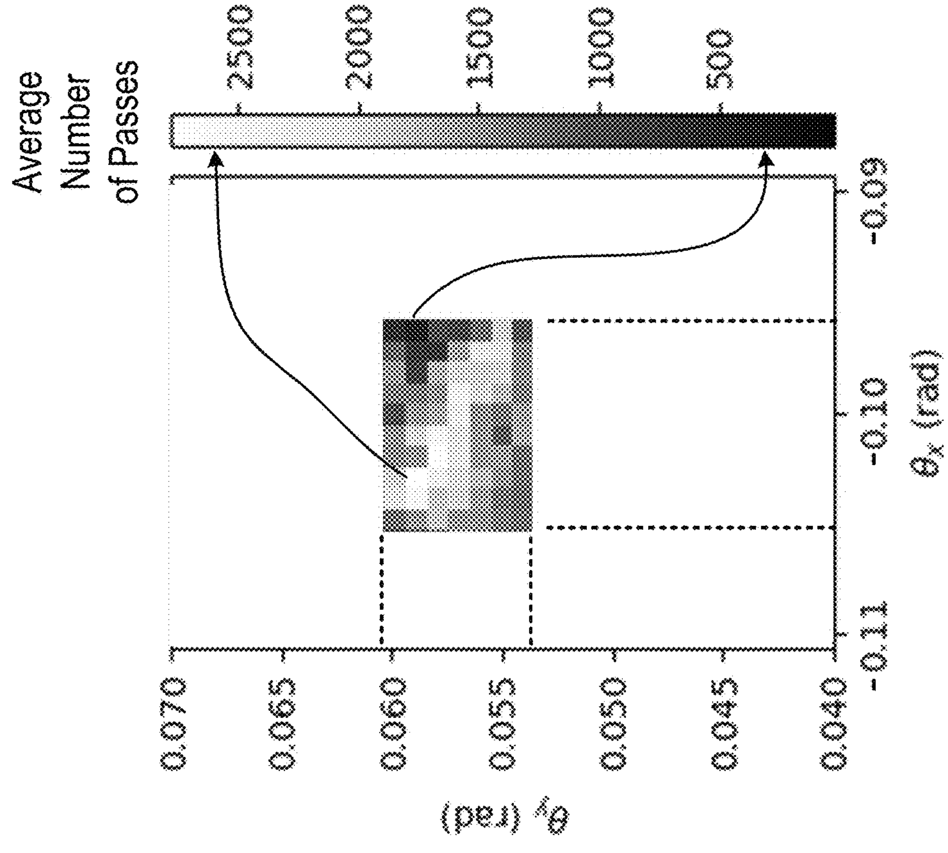
FIG. 12A is a graph of the average number of intracavity passes of a light beam for the third configuration of a multipass cell, as a function of the injection angle ($\theta_x$, $\theta_y$) of the light beam.
Figure 12B:
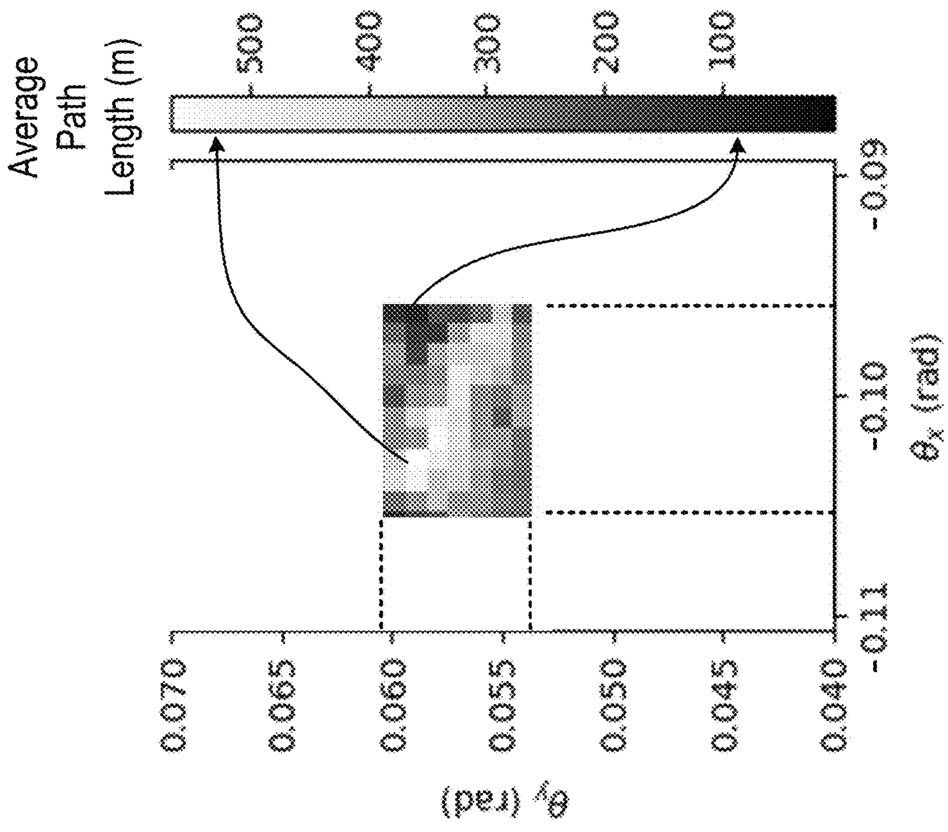
FIG. 12B is a graph of the average intracavity path length of a light beam for the third configuration of the multipass cell, as a function of the injection angle ($\theta_x$, $\theta_y$) of the light beam.

FIGS. 12A and 12B respectively present the average number of passes of a light beam and the average path length across an example range of injection angles for a multipass cell 204 configured as specified above. While numbers and lengths for injection angles outside of the example range have been obtained, for clarity of illustration those results have been redacted from the color (grayscale) map of FIGS. 12A and 12B.

With reference to FIG. 12A, injection angles with $\theta_x$ in the range of −0.105 radians to −0.096 radians and $\theta_y$ in the range of 0.054 radians and 0.061 radians provide an average number of passes in the range of 400-2600 as indicated by color (or grayscale) matches between the squares within the $\theta_x$ by $\theta_y$ grid and the side bar. With reference to FIG. 12B, injection angles with $\theta_x$ in the range of −0.105 radians to −0.096 radians and $\theta_y$ in the range of 0.054 radians and 0.061 radians provide an average path length in the range of 100-600 meters as indicated by color (or grayscale) matches between the squares within the $\theta_x$ by $\theta_y$ grid and the side bar.

Figure 12D:
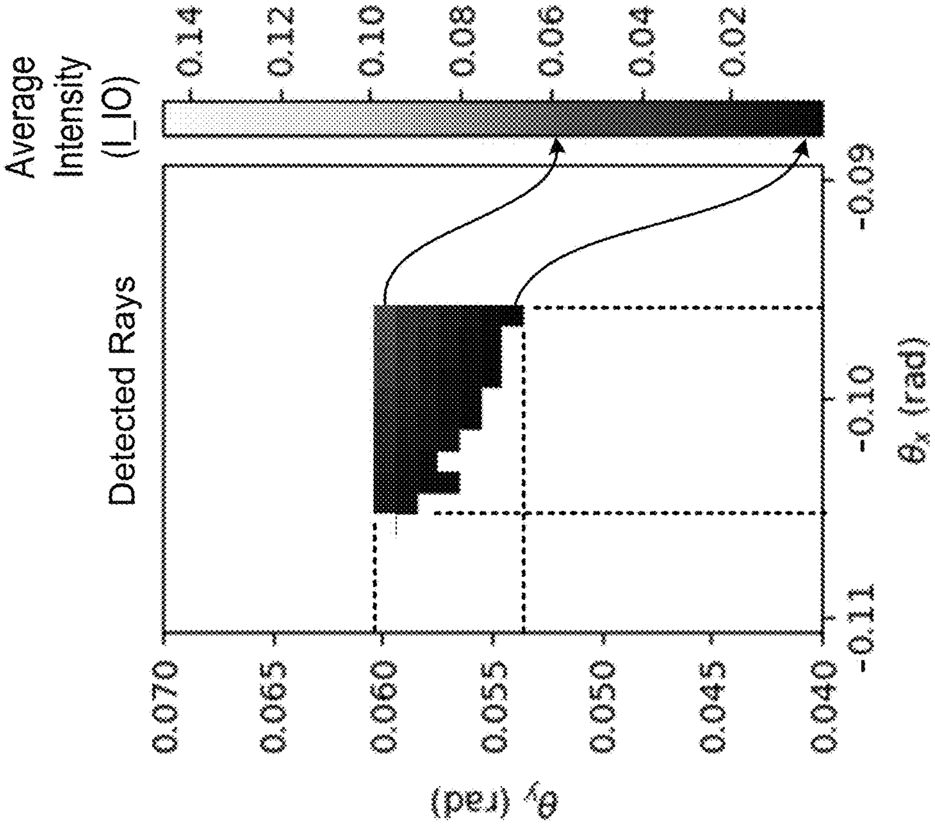
FIG. 12D is a graph of the average intensity of a detected light beam for the third configuration of the multipass cell, as a function of the injection angle (ex, $\theta_y$) of the light beam.
Figure 12C:
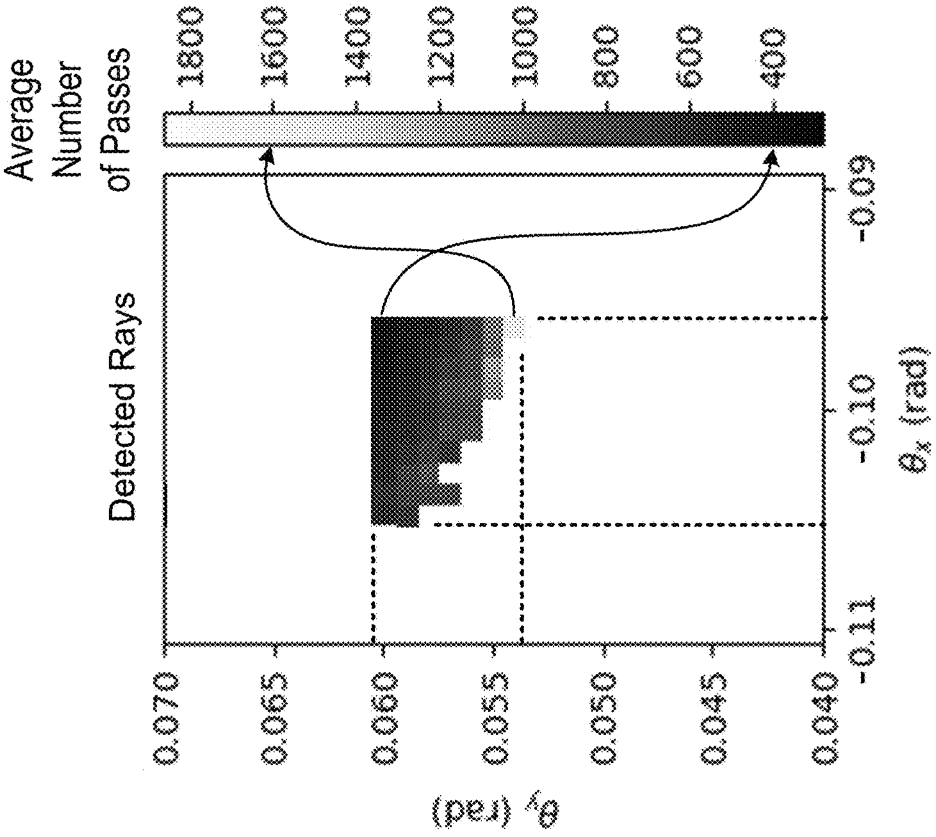
FIG. 12C is a graph of the average number of intracavity passes for a detected light beam for the third configuration of the multipass cell, as a function of the injection angle ($\theta_x$, $\theta_y$) of the light beam.

FIGS. 12C and 12D respectively present the average number of passes of a detected light beam and the average intensity of a detected beam across an example range of injection angles for a multipass cell 204 configured as specified above. While numbers and intensities for injection angles outside of the example range have been obtained, for clarity of illustration those results have been redacted from the color (grayscale) map of FIGS. 12C and 12D.

With reference to FIG. 12C, injection angles with $\theta_x$ in the range of −0.105 radians to −0.096 radians and $\theta_y$ in the range of 0.054 radians and 0.061 radians provide an average number of passes in the range of 400-1600 as indicated by color (or grayscale) matches between the squares within the $\theta_x$ by $\theta_y$ grid and the side bar. With reference to FIG. 12D, injection angles with $\theta_x$ in the range of −0.105 radians to −0.095 radians and $\theta_y$ in the range of 0.054 radians and 0.061 radians provide an average intensity of near zero to about 0.06 as indicated by color (or grayscale) matches between the squares within the $\theta_x$ by y grid and the side bar.

Fourth Example Configuration

In a fourth example, an optical system 200 having a multipass cell 204 having a short physical cell length, a pair of non-astigmatic mirrors, each with a large radius of curvature, and a large diameter, and an injection angle ($\theta x, y$) specified as follows provides a propagation path length of approximately 390 meters:

- first mirror 214=2.54 cm (2 inch) diameter with a radius of curvature (ROC) of 300 mm;
- second mirror 218=2.54 cm (2 inch) diameter with a ROC of 300 mm;
- cavity length (L)=156 mm;
- injection angle ($\theta_x$, $\theta_y$)=(−0.104, 0.06) radians;
- injection aperture 230=3 mm diameter, located 15 mm from the center 224 of the first mirror 214;
- collection aperture 232=1 mm diameter, located 15 mm from the center 224 of the first mirror, but rotated by +30 degrees relative to the injection aperture 230;
- injected light beam 210=has a gaussian profile with a 1/e width of 0.225 mm and is focused 1000 mm from the light source 202.

Figure 13A:
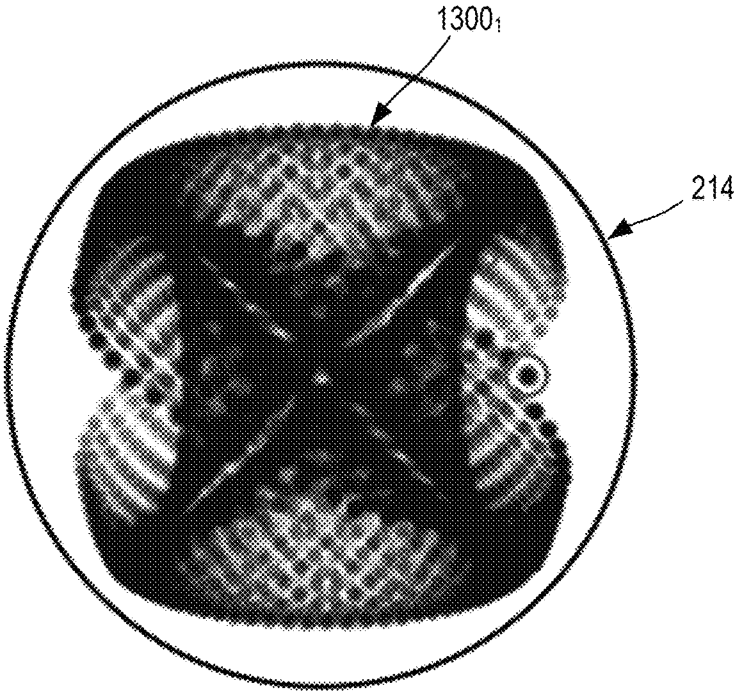
FIGS. 13A and 13B are illustrations of a final, cumulative spot pattern on a first mirror (FIG. 13A) and a final, cumulative spot pattern on a second mirror (FIG. 13B) resulting from intracavity reflections of a light beam between a first mirror and a second mirror of a fourth configuration of the multipass cell of FIG. 2A.
Figure 13B:
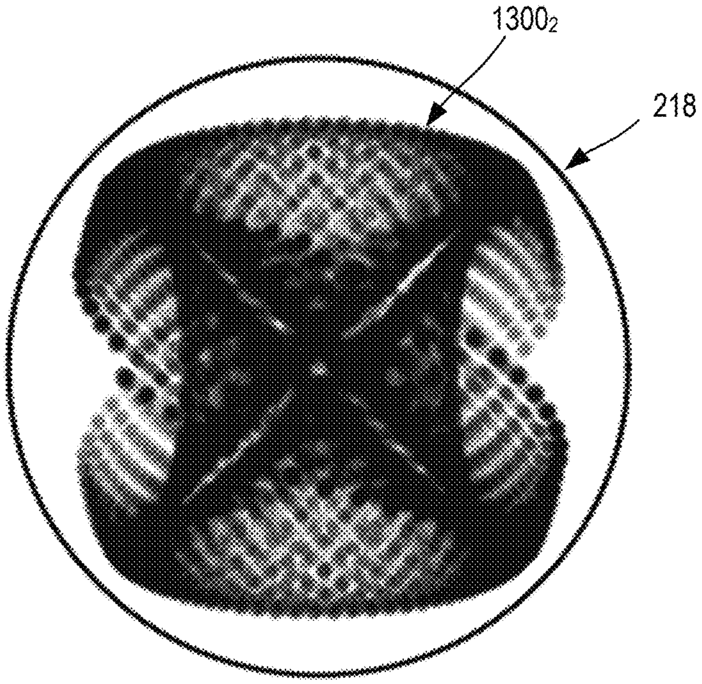

With reference to FIGS. 13A and 13B, this example of an optical system 200 results in a cumulative spot pattern $\mathbf{1300}_1$ on a first mirror 214 and a cumulative spot pattern $\mathbf{1300}_2$ on a second mirror 218. Like the cumulative spot patterns of FIGS. 6A and 6B, the cumulative spot patterns $\mathbf{1300}_1$, $\mathbf{1300}_2$ in FIGS. 9A and 9B are accumulations of fifty individual looped spot patterns, each comprise of fifty spots.

Figure 14B:
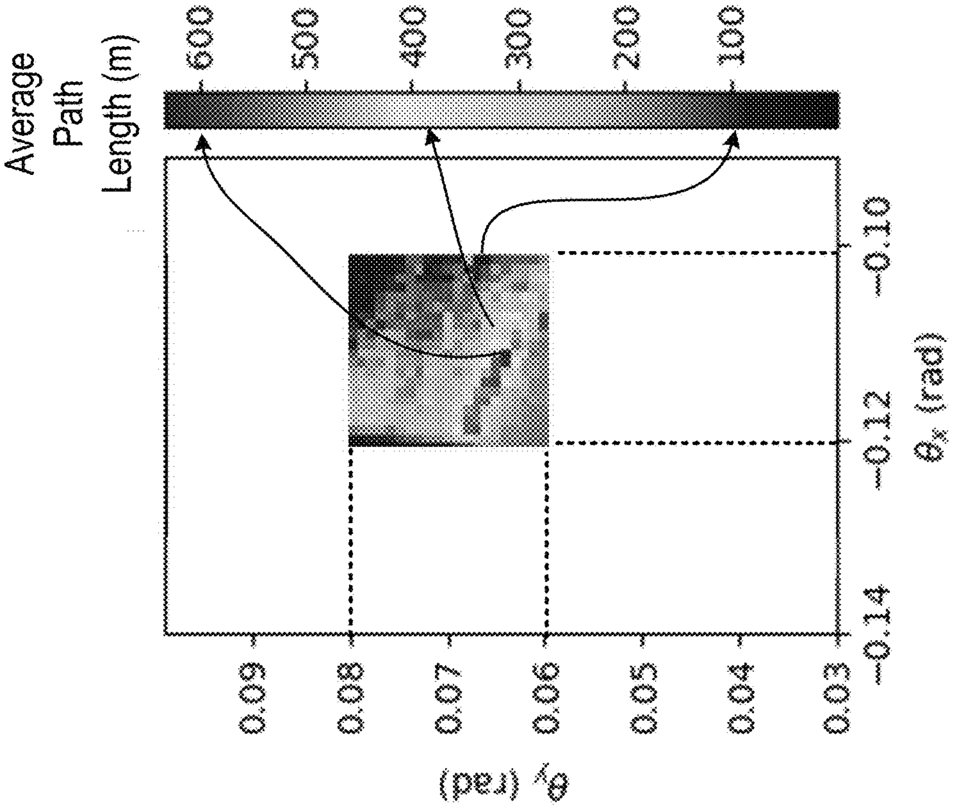
FIG. 14B is a graph of the average intracavity path length of a light beam for the fourth configuration of the multipass cell, as a function of the injection angle ($\theta_x$, $\theta_y$) of the light beam.
Figure 14A:
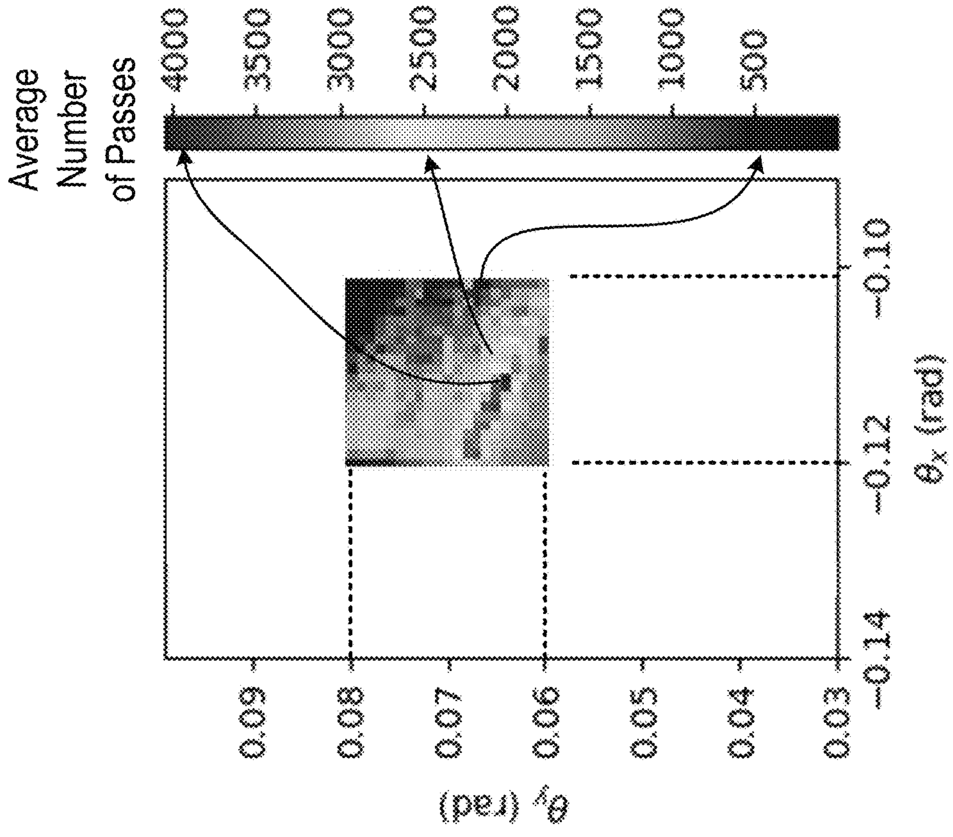
FIG. 14A is a graph of the average number of intracavity passes of a light beam for the fourth configuration of a multipass cell, as a function of the injection angle ($\theta_x$, $\theta_y$) of the light beam.

FIGS. 14A and 14B respectively present the average number of passes of a light beam and the average path length across a range of injection angles for a multipass cell 204 configured as specified above. While numbers and lengths for injection angles outside of the example range have been obtained, for clarity of illustration those results have been redacted from the color (grayscale) map of FIGS. 14A and 14B.

With reference to FIG. 14A, injection angles with $\theta_x$ in the range of −0.110 radians to −0.120 radians and $\theta_y$ in the range of 0.060 radians and 0.080 radians provide an average number of passes in the range of 500-4000 as indicated by color (or grayscale) matches between the squares within the $\theta_x$ by $\theta_y$ grid and the side bar. With reference to FIG. 14B, injection angles with $\theta_x$ in the range of −0.110 radians to −0.120 radians and $\theta_y$ in the range of 0.060 radians and 0.080 radians provide an average path length in the range of 100-600 meters.

Figure 14C:
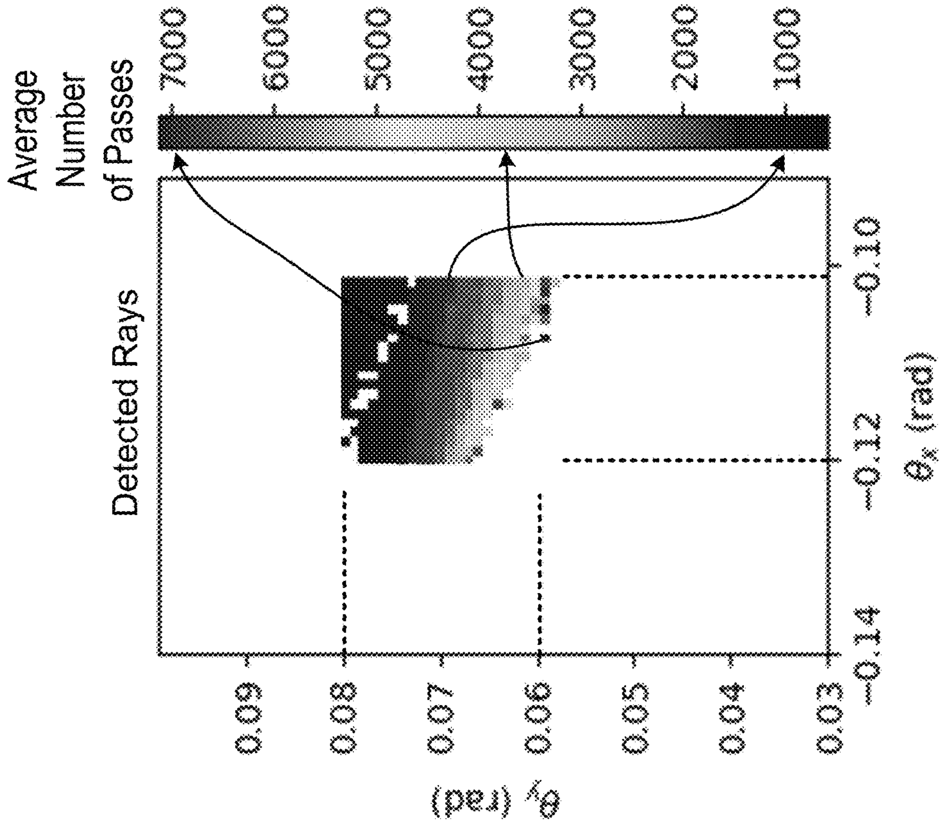
FIG. 14C is a graph of the average number of intracavity passes for a detected light beam for the fourth configuration of the multipass cell, as a function of the injection angle ($\theta_x$, $\theta_y$) of the light beam.
Figure 14D:
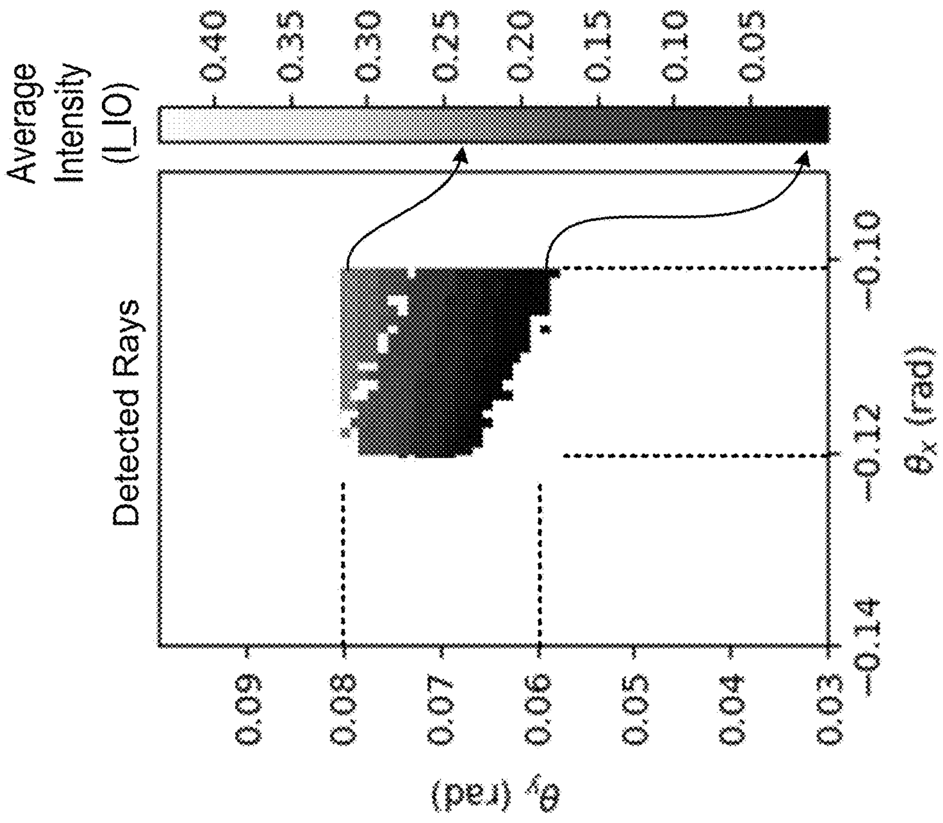
FIG. 14D is a graph of the average intensity of a detected light beam for the fourth configuration of the multipass cell, as a function of the injection angle ($\theta_x$, $\theta_y$) of the light beam.

FIGS. 14C and 14D respectively present the average number of passes of a detected light beam and the average intensity of a detected beam across a range of injection angles for a multipass cell 204 configured as specified above. While numbers and intensities for injection angles outside of the example range have been obtained, for clarity of illustration those results have been redacted from the color (grayscale) map of FIGS. 14C and 14D.

With reference to FIG. 14C, injection angles with $\theta_x$ in the range of −0.110 radians to −0.120 radians and $\theta_y$ in the range of 0.060 radians and 0.080 radians provide an average number of passes in the range of 1000-7000 as indicated by color (or grayscale) matches between the squares within the $\theta_x$ by $\theta_y$ grid and the side bar. With reference to FIG. 14D, injection angles with $\theta_x$ in the range of −0.110 radians to −0.120 radians and $\theta_y$ in the range of 0.060 radians and 0.080 radians provides an average intensity of near zero to about 0.250 as indicated by color (or grayscale) matches between the squares within the $\theta_x$ by $\theta_y$ grid and the side bar.

From the above examples it is shown that the number of reflections or passes of a light beam 210 within an optical cavity 226 and the total path length a light beam travels before exiting the optical cavity varies as a function of the injection angle ($\theta_x$, $\theta_y$). Thus, for a given configuration of a multipass cell 204, different injection angles (or alignments) of the light beam 210 may be selected to obtain a desired path length. Furthermore, by calculating the number of reflections and average path length for a broad range of injection angles, it is then possible to determine the cavity configurations, alignments and spot pattern shapes that make full use of the mirror surface and maximize the path length.

With reference to FIGS. 2A-2D, disclosed herein is an optical system 200, as referred to as an optical system, that includes a multipass cell 204 and a light source 202. The multipass cell 204 includes an optical cavity 226 between respective surfaces of a first mirror 214 having an injection aperture 230 and a second mirror 218 spaced apart from the first mirror 214 by an physical length. The physical length can be between 1 cm and 50 cm. The first mirror 214 and the second mirror 218 are non-astigmatic mirrors, e.g., approximately spherical mirrors or cylindrical mirrors, and have a radius of curvature between 5 cm and 50 cm.

The light source 202 is optically coupled with the multipass cell 204 so that a light beam 210 output by the light source travels along an injection path 213*a*, 213*b* at an injection angle ($\theta_x$, $\theta_y$) through the injection aperture 230 into the optical cavity 226. The injection angle ($\theta_x$, $\theta_y$) induces non-paraxial propagation of the light beam 210 between the first mirror 214 and the second mirror 218 for an intracavity propagation length between 10 meters and 2000 meters. The injection angle ($\theta_x$, $\theta_y$) also induces a precession of the reflections of the light beam 210 relative to the respective center 224, 228 of each of the first mirror 214 and the second mirror 218.

In some embodiments, the optical system 200 includes a mechanism 203*a*, 203*b*, 203*c* configured to change the injection angle ($\theta_x$, $\theta_y$) to thereby change at least one of the intracavity propagation length and an intensity of light within the optical cavity 226.

In one configuration, the mechanism 203*b* comprises one or more of a motor or a gimbal associated with an assembly of the first mirror 214 and the second mirror 218. The motor or the gimbal is configured to adjust the orientation of the assembly of the first mirror 214 and the second mirror 218 relative to the injection path to thereby change the injection angle ($\theta_x$, $\theta_y$). The orientation of the assembly of the first mirror 214 and the second mirror 218 can be adjusted to maintain an overlap between the light beam 210 and the injection aperture 230 that produces an intensity of light within the optical cavity 226 that satisfies an intensity criterium. The orientation of the assembly of the first mirror 214 and the second mirror 218 can be adjusted to provide an intracavity propagation length that satisfies a length criterium. The orientation of the assembly of the first mirror 214 and the second mirror 218 can be adjusted to both 1) produce an intensity of light within the optical cavity 226 that satisfies an intensity criterium and 2) provide an intracavity propagation length that satisfies a length criterium.

In another configuration, the mechanism 203*c* comprises one or more of a motor or a gimbal associated with the light source 202. The motor or the gimbal is configured to adjust the orientation of the light source 202 relative to the injection aperture 230 of the multipass cell 204 to thereby change the orientation of the injection path. The orientation of the light source 202 can be adjusted to maintain an overlap between the light beam 210 and the injection aperture 230 that produces an intensity of light within the optical cavity 226 that satisfies an intensity criterium. The orientation of the light source 202 can be adjusted to provide an intracavity propagation length that satisfies a length criterium. The orientation of the light source 202 can be adjusted to 1) produce an intensity of light within the optical cavity 226 that satisfies an intensity criterium, and 2) provide an intracavity propagation length that satisfies a length criterium.

In another configuration, the optical system 200 includes an optics assembly 205 optically coupled with the light source 202 and configured to receive the light beam 210 and direct the light beam through the injection aperture 230. The mechanism 203*a* comprises a motor or gimbal associated with the optics assembly 205, and is configured to adjust the orientation of the injection path 213*a*, 213*b*. The orientation of the injection path 213*a*, 213*b* can be adjusted to maintain an overlap between the light beam 210 and the injection aperture 230 that produces an intensity of light within the optical cavity 226 that satisfies an intensity criterium. The orientation of the injection path 213*a*, 213*b* can be adjusted to provide an intracavity propagation length that satisfies an length criterium. The orientation of the injection path 213*a*, 213*b* can be adjusted to both 1) produce an intensity of light within the optical cavity 226 that satisfies an intensity criterium and 2) provide an intracavity propagation length that satisfies a length criterium.

With reference to FIGS. 6A and 8A-8C, the precession of the reflections of the light beam 210 produce a cumulative spot pattern $600_1$ on the first mirror 214 that is a accumulation of a plurality (N) of individual looped spot patterns $301_1$, $301_2$ $301_3$, $301_4$. In some embodiments, each individual looped spot pattern $301_1$, $301_2$ $301_3$, $301_4$ extends around the center 224 of the first mirror, and the individual looped spot patterns process relative to the center 224 of the first mirror such that, while forming the second individual looped spot pattern the central light ray of the light beam 210 is not within a distance D of an edge of injection aperture or an edge of the collection aperture, where D is greater than 0.1 of the diameter of the injection aperture or the diameter of the collection aperture. Similarly, and with reference to FIG. 6B, the precession of the reflections of the light beam 210 produce a cumulative spot pattern $600_2$, on the second mirror 218 that is a accumulation of a plurality (N) of individual looped spot patterns.

Method of Light Beam Propagation

Figure 15:
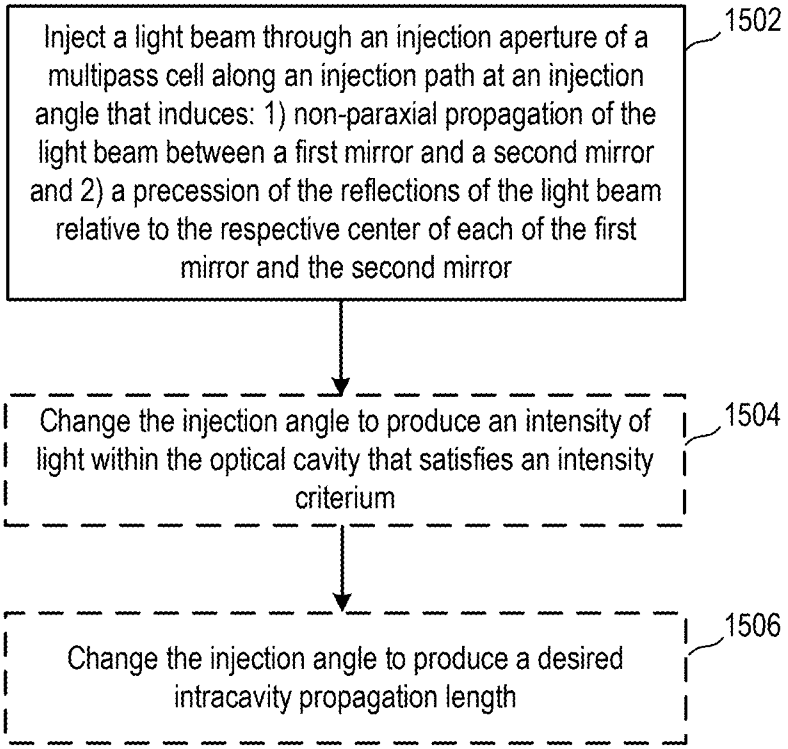
FIG. 15 is a flowchart of a method of propagating a light beam.

With reference to FIG. 15, a method of propagating a light beam is disclosed. The method can be performed by the optical system 200 that includes a multipass cell 204 comprising an optical cavity 226 between respective surfaces of a first mirror 214 having an injection aperture 230 and a second mirror 218 spaced apart from the first mirror 214 by a physical length between 1 cm and 50 cm, wherein the first mirror and the second mirror are non-astigmatic and have a radius of curvature between 5 cm and 50 cm.

At block 1502, a light beam is injected through the injection aperture 230 along an injection path at an injection angle ($\theta_x$, $\theta_y$) that induces: 1) non-paraxial propagation of the light beam 210 between the first mirror 214 and the second mirror 218 for an intracavity propagation length between 10 meters and 2000 meters, and 2) a precession of the mirror reflections of the light beam 210 relative to the respective center 224, 228 of each of the first mirror 214 and the second mirror 218.

At optional block 1504, the injection angle ($\theta_x$, $\theta_y$) is changed to produce an intensity of light within the optical cavity 226 that satisfies an intensity criterium. In embodiments where the light source 202 is a coherent light source, the intensity criterium is at least 50% of the intensity of the light beam 210 output by the coherent light source. In embodiments where the light source 202 is a non-coherent light source, the intensity criterium is at least 50% of the intensity of the light beam 210 output by the non-coherent light source.

At optional block 1506, the injection angle ($\theta_x$, $\theta_y$) is changed to produce a desired intracavity propagation length. The intracavity propagation length of the light beam 210 within the optical cavity 226 can be between 10 meters and 2000 meters.

Method of Absorption Measurement

Figure 16:
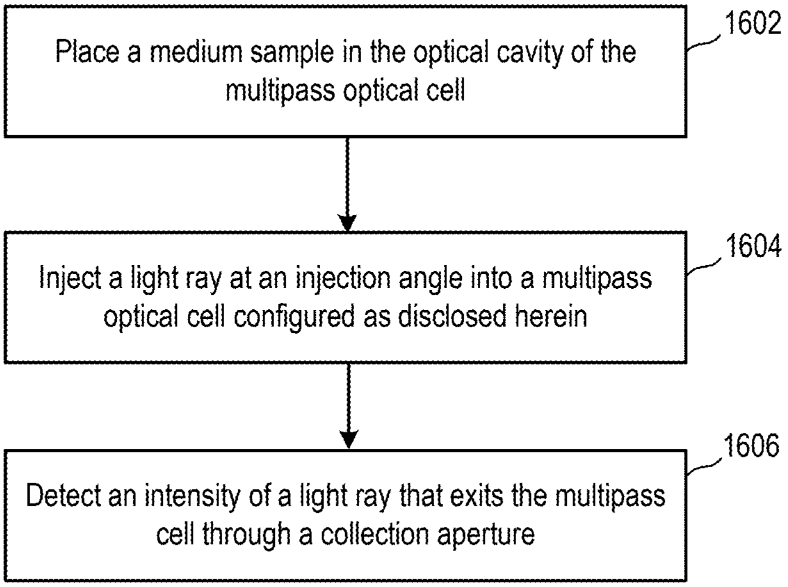
FIG. 16 is a flowchart of a method of performing an absorption measurement of a medium sample.
Figure 17A:
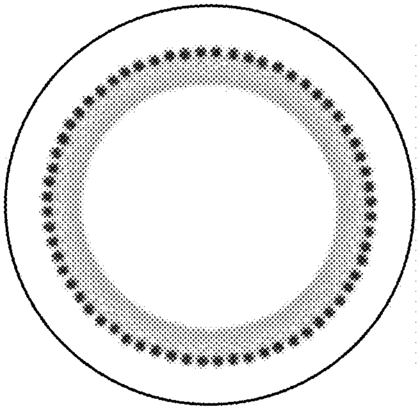
FIG. 17A (Prior Art)
FIGS. 17A-17D are examples of spots patterns produced by prior multipass cells.
Figure 17B:
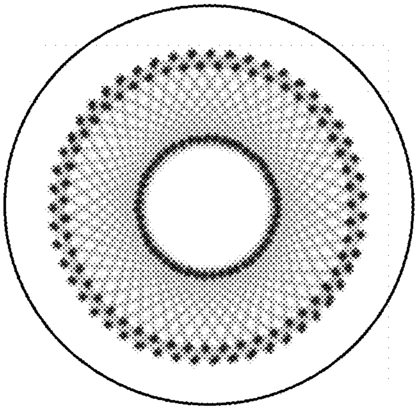
FIG. 17B (Prior Art)
Figure 17C:
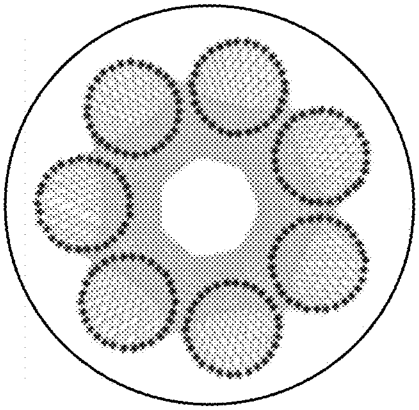
FIG. 17C (Prior Art)
Figure 17D:
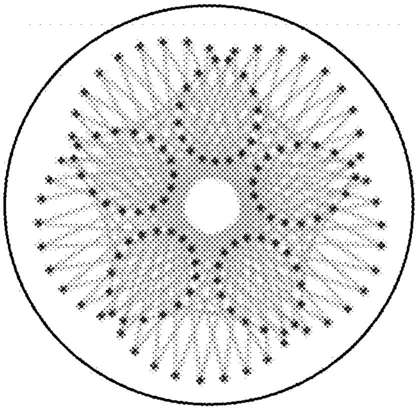
FIG. 17D (Prior Art)

With reference to FIG. 16, a method of performing an absorption measurement of a medium sample is disclosed. The method can be performed by the optical system 200 disclosed herein.

At block 1602, a medium sample is placed in an optical cavity 226 of a multipass cell 204. The multipass cell 204 includes a first mirror 214 and a second mirror 218 spaced apart from the first mirror 214, a central axis 222 that extends through a center 224 of the first mirror and a center 228 of the second mirror, an injection aperture 230 through the first mirror, and a collection aperture 232. The optical cavity 226 is space between respective surfaces of the first mirror 214 and the second mirror 218. In the case of an optical cavity 226 that is closed, a medium sample is placed in the closed optical cavity by injecting the medium sample into the optical cavity through a medium port. In the case of an optical cavity 226 that is opened, a medium sample is placed in the opened optical cavity by locating the optical system 200 in an environment that includes the medium sample.

At block 1604, a light beam 210 having a wavelength corresponding to an absorption region of interest is injected into the optical cavity 226 of the multipass cell 204 through the injection aperture 230 and propagates back-and-forth between the first mirror 214 and the second mirror 218 until it exits the optical cavity 226 through the collection aperture 232. The optical system 200 is configured such that propagation of the light beam 210 within the optical cavity 226 produces a cumulative spot pattern $600_1$ on the first mirror 214 and a cumulative spot pattern $600_2$ on the second mirror 218.

Each cumulative spot pattern $600_1$, $600_2$ is a accumulation of a plurality (N) of individual looped spot patterns, where each individual looped spot pattern of the first mirror 214 extends around the center 224 of the first mirror, and each individual looped spot pattern of the second mirror 218 extends around the center 228 of the second mirror, while the looped spot patterns for each mirror process about the center of that mirror, as shown and described above for example with reference to FIGS. 8A-8C. Configured as such, the intracavity propagation length of the light beam 210 within the optical cavity 226 can be between 10 meters and 2000 meters.

At block 1606, an intensity of a light beam 210 that exits the optical cavity 226 through the collection aperture 232 is detected and analyzed to obtain absorption measurements.

The various aspects of this disclosure are provided to enable one of ordinary skill in the art to practice the present invention. Various modifications to exemplary embodiments presented throughout this disclosure will be readily apparent to those skilled in the art. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. An optical system comprising:

multipass cell comprising:

- an optical cavity between respective surfaces of a first mirror and a second mirror spaced apart from the first mirror,
- a central axis that extends through a center of the first mirror and a center of the second mirror,
- an injection aperture through the first mirror, and
- a collection aperture;

a light source arranged relative to the multipass cell to output a light beam along an injection path at an injection angle through the injection aperture into the optical cavity; and a detector arranged relative to the collection aperture to receive the light beam, wherein the multipass cell and the injection angle are configured such that intracavity propagation of the light beam produces a cumulative spot pattern on the first mirror that is a cumulation of a plurality (N) of individual looped spot patterns, where each individual looped spot pattern extends around the center of the first mirror, and the individual looped spot patterns precess relative to the center of the first mirror such that, while forming the second individual looped spot pattern a central light ray of the light beam is not within a distance D of an edge of the injection aperture or an edge of the collection aperture, where D is greater than 0.1 of the diameter of the injection aperture or the diameter of the collection aperture.

2. The optical system of claim 1, wherein, while forming any one of a third looped spot pattern through to and including the penultimate looped spot pattern $(N-1)_1$ on the first mirror, the central light ray is not within the distance D of the edge of the injection aperture or the edge of the collection aperture.

3. The optical system of claim 2, wherein the second individual looped spot pattern on the first mirror approximates a second ellipse.

4. The optical system of claim 3, wherein the second ellipse has a major axis greater than the major axis of a first ellipse approximated by the first individual looped spot pattern, and a minor axis less than the minor axis of first ellipse.

5. The optical system of claim 1, wherein intracavity propagation of the light beam produces a cumulative spot pattern on the second mirror that is a cumulation of a plurality (N) of individual looped spot patterns, where each individual looped spot pattern extends around the center of the second mirror, and the individual looped spot patterns precess relative to the center of the second mirror such that, while forming the second individual looped spot pattern on the second mirror, the central light ray is not within a distance D of an edge of the collection aperture, where D is greater than 0.1 of the diameter of the collection aperture.

6. The optical system of claim 5, wherein, while forming anyone of a third looped spot pattern through to and including the penultimate looped spot pattern $(N-1)_1$ on the second mirror, the central light ray is not within the distance D of the edge of the collection aperture.

7. The optical system of claim 5, wherein the second individual looped spot pattern on the second mirror approximates a second ellipse.

8. The optical system of claim 7, wherein the second ellipse has a major axis greater than the major axis of a first ellipse approximated by the first individual looped spot pattern on the second mirror, and a minor axis less than the minor axis of first ellipse.

9. The optical system of claim 1, wherein N is in a range of 25 to 20000.

10. The optical system of claim 1, wherein the injection angle is characterized by:

- a first angle $\theta_x$ between a projection of the injection path on an xz plane and an axis that is parallel with the central axis; and
- a second angle $\theta_y$ between a projection of the injection path on an yz plane and the axis that is parallel with the central axis.

11. The optical system of claim 10, wherein the first angle $\theta_x$ is in a range of 0.2 radians to 0.010 radians or −0.2 radians to −0.010 radians.

12. The optical system of claim 10, wherein the second angle $\theta_y$ is in a range of 0.01 radians to 0.015 radians or −0.01 radians to −0.015 radians.

13. The optical system of claim 1, wherein:

- the optical cavity has a cavity length L between the respective surfaces of the first mirror and the second mirror that measures between 1 cm and 50 cm, and
- the first mirror and the second mirror are spherical and have a radius of curvature between 5 cm and 50 cm.

14. The optical system of claim 1, wherein:

- the optical cavity has a cavity length L between the respective surfaces of the first mirror and the second mirror that measures between 1 cm and 50 cm, and the first mirror and the second mirror are cylindrical and have a radius of curvature between 10 cm and 50 cm.

15. The optical system of claim 1, wherein the collection aperture is the same aperture as the injection aperture.

16. The optical system of claim 1, wherein the collection aperture is through one of the first mirror and the second mirror.

17. The optical system of claim 1, wherein the intracavity propagation of the light beam has a length that measures between 10 meters and 2000 meters.

18. The optical system of claim 1, wherein an intensity of the light beam that passes through the injection aperture satisfies an intensity criterium.

19. The optical system of claim 18, wherein the light source is a coherent light source and the intensity criterium is at least 50% of the intensity of the light beam output by the coherent light source.

20. The optical system of claim 18, wherein the light source is a non-coherent light source and the intensity criterium is at least 50% of the intensity of the light beam output by the non-coherent light source.

21. The optical system of claim 1, further comprising a mechanism configured to change the injection angle.

22. A method of performing an absorption measurement of a medium sample, the method comprising:

placing a medium sample in an optical cavity of a multipass cell configured in accordance with claim 1;

injecting a light beam having a wavelength corresponding to an absorption region of interest into the multipass cell; and detecting an intensity of a light beam that exits the multipass cell through a collection aperture of the multipass cell after having propagated within the optical cavity for an intracavity propagation length between 10 meters and 2000 meters.

* * * * *